United States Patent
David et al.

(10) Patent No.: US 11,884,161 B2
(45) Date of Patent: Jan. 30, 2024

(54) DRIVETRAIN WITH INFINITELY AND ELECTRICALLY VARIABLE TRANSMISSION CAPABILITIES

(71) Applicant: Dana Heavy Vehicle Systems Group, LLC, Maumee, OH (US)

(72) Inventors: Jeffrey M. David, Cedar Park, TX (US); Travis J. Miller, Austin, TX (US); Mark A. Davis, Opelika, AL (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 319 days.

(21) Appl. No.: 17/315,131

(22) Filed: May 7, 2021

(65) Prior Publication Data
US 2022/0355677 A1 Nov. 10, 2022

(51) Int. Cl.
*B60L 15/20* (2006.01)
*B60K 17/12* (2006.01)

(52) U.S. Cl.
CPC .......... *B60L 15/2054* (2013.01); *B60K 17/12* (2013.01); *B60L 15/2045* (2013.01); *B60L 2240/12* (2013.01); *B60L 2240/421* (2013.01); *B60L 2240/423* (2013.01); *B60Y 2400/73* (2013.01)

(58) Field of Classification Search
CPC ............. B60L 15/2045; B60L 15/2054; B60L 2240/423; B60Y 2400/73
See application file for complete search history.

(56) References Cited

U.S. PATENT DOCUMENTS

| | | | |
|---|---|---|---|
| 7,164,247 B2 | 1/2007 | Joe et al. | |
| 8,317,648 B2 | 11/2012 | Robinette et al. | |
| 8,734,281 B2* | 5/2014 | Ai | B60K 6/365 475/5 |
| 9,028,362 B2* | 5/2015 | He | B60K 6/52 477/3 |
| 9,580,065 B2 | 2/2017 | Bangura et al. | |
| 2004/0149501 A1* | 8/2004 | Imazu | B60L 15/20 903/910 |
| 2006/0289212 A1* | 12/2006 | Haruhisa | F16H 3/728 180/65.285 |

(Continued)

FOREIGN PATENT DOCUMENTS

| | | |
|---|---|---|
| DE | 102012219947 A1 | 5/2013 |
| KR | 20200051915 A | 5/2020 |

OTHER PUBLICATIONS

Benford, H. et al., "The Lever Analogy: a New Tool in Transmission Analysis," SAE International Congress and Exposition, Technical Paper 810102, Feb. 1, 1981, 12 pages.

*Primary Examiner* — Brian L Swenson
(74) *Attorney, Agent, or Firm* — McCoy Russell LLP

(57) ABSTRACT

Methods and systems are provided for an electric drive train of a vehicle. In one example, a method may include operating a first motor of a set of motors in a torque control mode at a first speed while operating a second motor of the set of motors in a speed control mode at a second speed. The second speed may be determined based on the first speed and torque may be summed at an output node of a planetary gear set coupled to each of the set of motors.

20 Claims, 17 Drawing Sheets

(56) References Cited

U.S. PATENT DOCUMENTS

| | | | |
|---|---|---|---|
| 2011/0130234 A1* | 6/2011 | Phillips | B60L 50/61 |
| | | | 475/5 |
| 2011/0251747 A1* | 10/2011 | Imai | B60K 6/365 |
| | | | 180/65.285 |
| 2013/0203551 A1 | 8/2013 | Mellet et al. | |
| 2014/0100071 A1* | 4/2014 | Kimes | B60K 6/383 |
| | | | 475/5 |
| 2016/0368361 A1 | 12/2016 | Endo et al. | |
| 2017/0120889 A1* | 5/2017 | Choi | B60W 10/26 |
| 2017/0197613 A1 | 7/2017 | Gv et al. | |
| 2019/0077255 A1* | 3/2019 | Misu | B60K 1/02 |
| 2021/0095744 A1 | 4/2021 | David et al. | |

\* cited by examiner

DRIVETRAIN WITH INFINITELY AND ELECTRICALLY VARIABLE TRANSMISSION CAPABILITIES

TECHNICAL FIELD

The present description relates generally to methods and systems for an electric drivetrain.

BACKGROUND AND SUMMARY

Electric drivetrains (e.g., e-drives) may be implemented in hybrid electric vehicles (HEVs) and all-electric vehicles (EVs) to enable torque generated at one or more electric motors to be translated to vehicle motion. In an HEV, an e-drive may reduce a reliance on a fuel-combusting engine, thereby increasing fuel economy and reducing emissions. For both HEVs and EVs, the e-drive may include a transmission which may utilize, as an example, gears and gear trains to convert speed and torque from at least one rotating power source, e.g., the engine and/or one or more electric motors, to drive rotation of the vehicle's wheels.

A maximum torque output of an electric motor may be delivered at lower speed range compared to, for example, an internal combustion engine. To at least partially offset the maximum torque range of the electric motor, the vehicle may include more than one electric motor with different torque and power capabilities. Additionally, to increase an efficiency and range of the electric motor, it may be desirable to provide the vehicle with a continuously variable transmission (CVT), e.g., a transmission with a continuously variable speed ratio over its allowable range. As such, an infinite number of ratios are possible between operational speed ratio limits of the CVT, allowing torque and speed ratio to be controlled independently of one another.

However, the inventors herein have recognized potential issues with such systems. As one example, e-drives, whether configured as a CVT or another type of transmission, may be constrained to a fixed motor speed for a given road speed. As a result, optimization of e-drive efficiency, operation at constant torque, and regenerative power capacity may be limited and unsatisfactory. Some approaches to address these issues include employing multi-mode gearboxes, for example. Another example includes arranging dual motors on a common axis and enabling single motor operation. Such attempts, however, are unable to alleviate a single degree of freedom (DOF) constraint to vehicle speed.

In one example, the issues described above may be addressed by a method for an electric drive train of a vehicle, including operating a first motor of a set of motors in a torque control mode at a first speed, and operating a second motor of the set of motors in a speed control mode at a second speed, the second speed determined based on the first speed of the first motor. The method further includes summing a first torque generated by the first motor and a second torque generated by the second motor at an output node of a planetary gear set coupled to each of the first and the second motors, wherein the first motor and the second motor are coupled to the planetary gear set on opposite sides of the output node of the planetary gear set. In this way, the planetary gear set offers an additional DOF that allows decoupling of motor speed from vehicle speed.

As one example, by positioning the first and second motors on opposite sides of the output node of the planetary gear set, the electric drive train may be operated at pseudo mechanical points, allowing high efficiency operation that conserves battery power. In addition, operation of the electric drive train may be readily adjusted between a dual motor and a single motor mode. In the single motor mode, the electric drive train may be operated at a virtual reaction node, where torque multiplication is enabled. The configuration and control strategies for the electric drive train as described herein impart both electrically variable transmission (EVT) and infinitely variable transmission (IVT) capabilities. Operational modes of the electric drive are thereby expanded, allowing efficiency targets to be met.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

An efficiency and performance of a conventional e-drive may be adversely affected by a coupling of motor speed to vehicle speed. A range of possible speed ratios of the motor is thus constrained, inhibiting an ability of the e-drive to provide peak torque and power according to vehicle operation. In one example, this issue may be at least partially addressed by configuring a vehicle with an e-drive including an input-coupled planetary gear train. The input-coupled planetary gear train may provide an additional degree of freedom (DOF), where the DOF is a number of independent variables defining a configuration or state of a system, when used in conjunction with a dual motor arrangement, and may be applied to both hybrid electric vehicles (HEVs) and all-electric vehicles (EVs). As a result, the e-drive may be operated to accommodate a variety of modes and may include a capacity to operate as an infinitely variable transmission (IVT) in an EV or when the engine is off in an HEV.

The IVT is a type of CVT that is able to provide a speed ratio of zero, thereby enabling an infinite speed ratio range and delivering an increased capacity for matching e-drive operation to a desired vehicle performance. When the e-drive includes a fixed gear ratio coupling between at least one motor and vehicle speed, operation as an IVT is not possible. By configuring the e-drive with the input-coupled planetary gear train to provide the additional DOF, one motor may be held near zero speed to enable the e-drive to function as an IVT. Furthermore, in an HEV, a two mode, dual mechanical point power split hybrid operation and a dual motor hybrid mode is provided in addition to the EV mode. In addition, the input-coupled planetary gear train may allow single motor operation with torque multiplication, thereby generating increased torque relative to a conventional e-drive with a dual motor arrangement.

Figure 1:
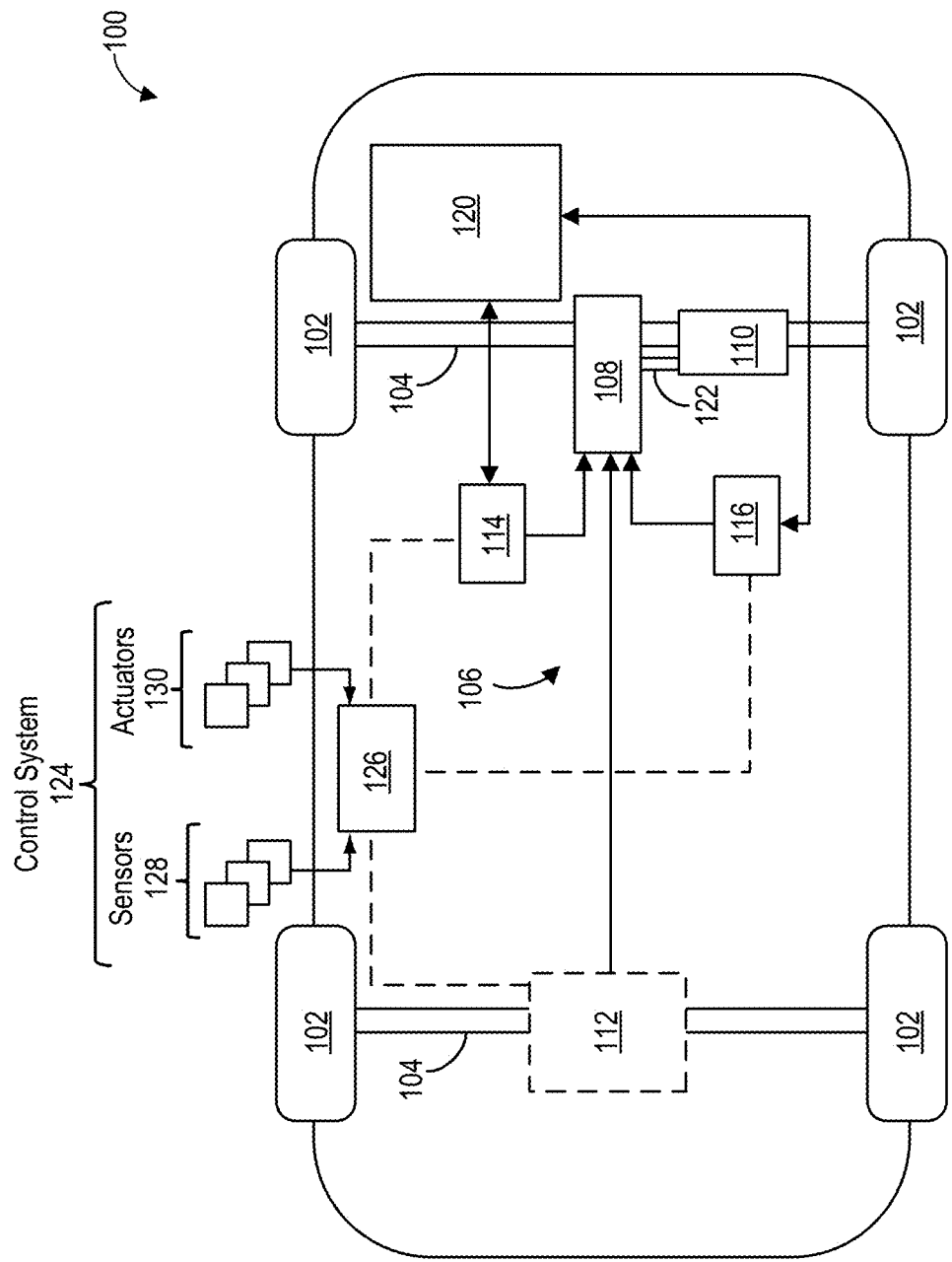
FIG. 1 shows a schematic diagram of an electrical drive train (e-drive) of a vehicle.
Figure 21:
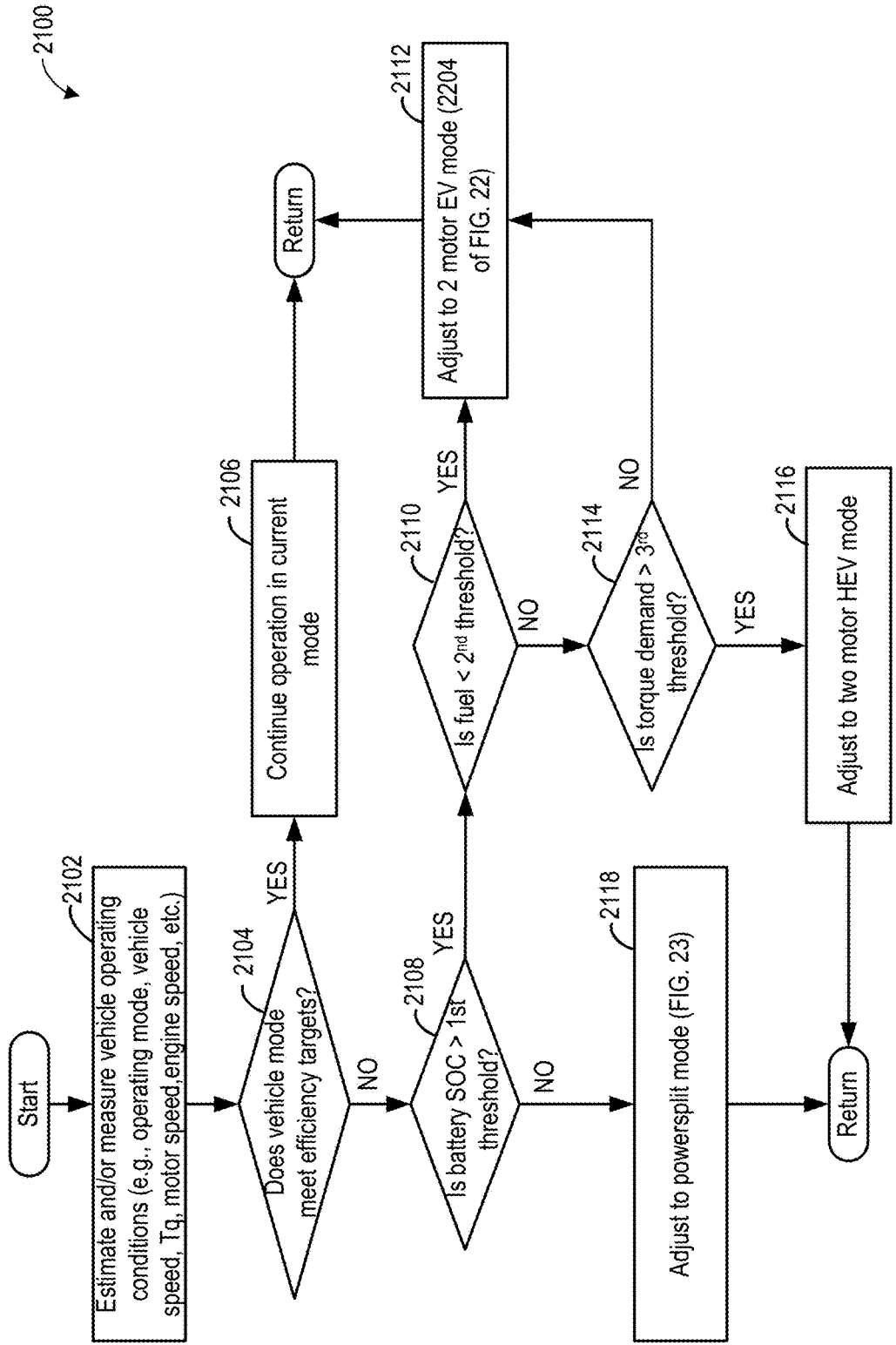
FIG. 21 shows an example of a method for operating an e-drive of an HEV.
Figure 22:
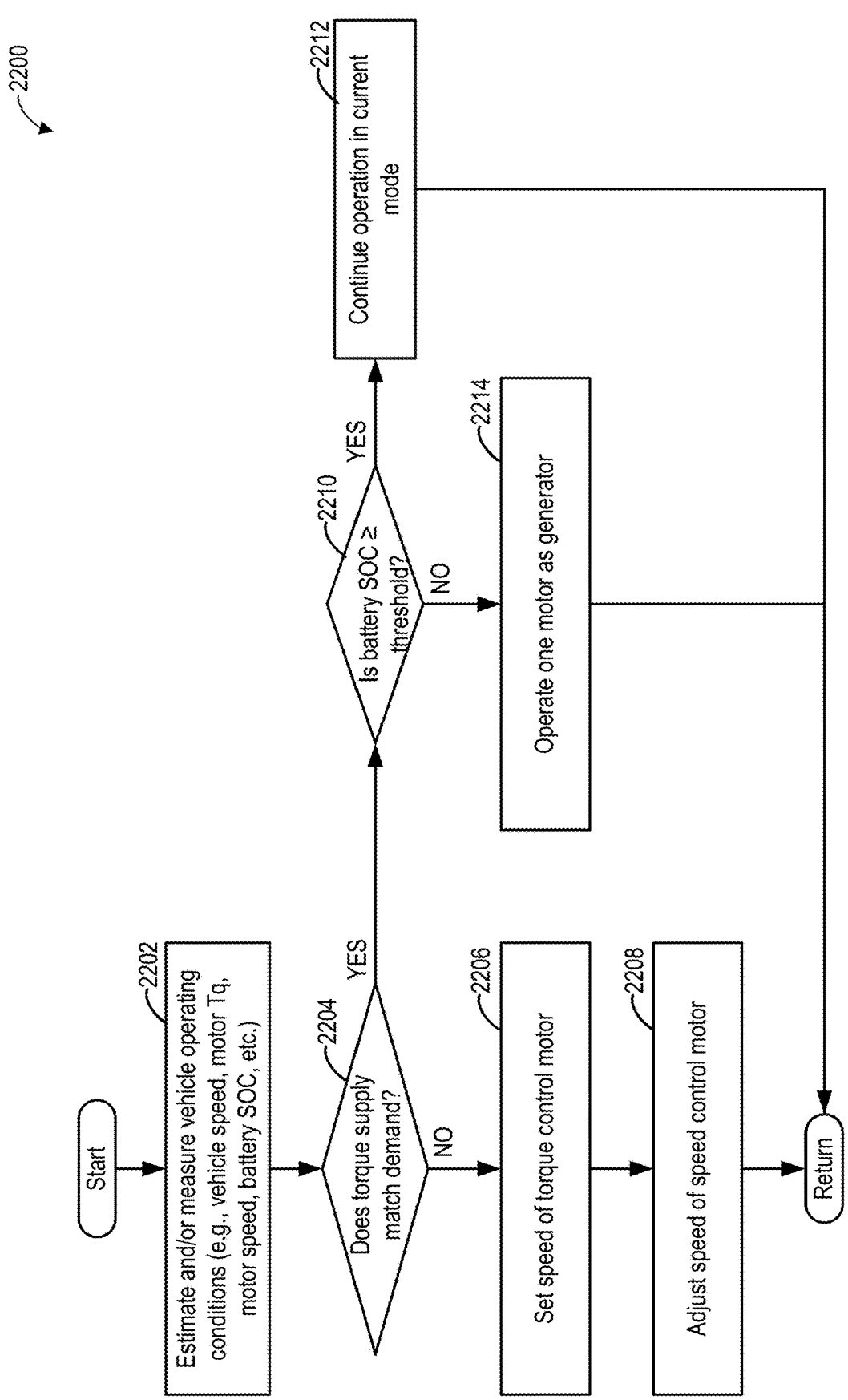
FIG. 22 shows an example of a method for operating an e-drive of an EV or the HEV operating in an EV mode.
Figure 23:
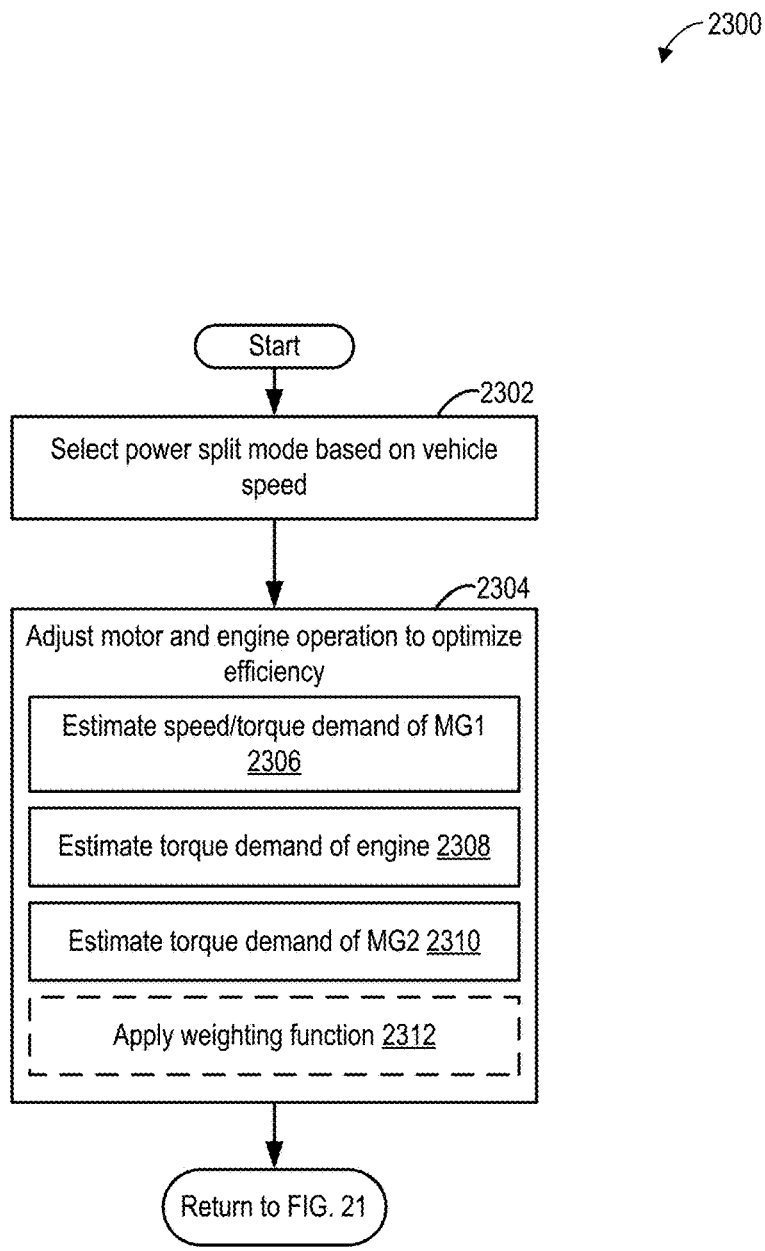
FIG. 23 shows an example of a method for operating the e-drive of the HEV in a power split mode.

Aspects of the input-coupled planetary gear train are described in detail further below. For example, a schematic diagram of a vehicle configured with an e-drive is depicted in FIG. 1, where the vehicle may be an HEV or an EV. Application of the input-coupled planetary gear train to an HEV is described with respect to operational modes and corresponding controls with reference to FIGS. 2-8. A high level example of a method for operating the input-coupled planetary gear train in the HEV is depicted in FIG. 21 and an example of a method for operating the input-coupled planetary gear train in a power split mode is shown in FIG. 23. Implementation of the input-coupled planetary gear train in an EV is depicted in various configurations in FIGS. 9-20. A high level example of a method for operating the input-coupled planetary gear train in the EV is shown in FIG. 22.

Turning now to FIG. 1, for an HEV, torque may be provided to a vehicle's wheels from more than one source, including one or more electric motors and an engine. A schematic representation of a vehicle 100 is depicted in FIG. 1 which include sets of wheels 102 coupled by axles 104 (e.g., pairs of wheels are coupled to one another by the axles 104). It will be appreciated that vehicle 100 is shown in FIG. 1 for illustrative purposes and is a non-limiting example of how an HEV or EV may be configured. Other examples include various arrangements and positioning of components of the vehicle described below as well as additional components not shown in FIG. 1 for brevity.

A drive train 106 of vehicle 100 may include a transmission 108 (e.g., a gear box, gear train, etc.) coupled to one or more of the axles 104 of vehicle 100. The transmission 108 may be coupled to a rear axle of the axles 104, as shown in FIG. 1, to a front axle or to both axles, in other examples. The transmission 108 may be mechanically coupled to a final drive 110 of the drive train 106 which, for example, may be a differential or any other suitable gearing. The transmission 108 and final drive 110 may together translate speed and torque from a rotating source to the vehicle wheels 102 to propel vehicle 100.

When configured as an HEV, the rotating source may be an engine 112, e.g., an internal combustion engine, a first electric machine 114, and/or a second electric machine 116. When vehicle 100 is an EV, engine 112 may be omitted. In some examples, and as described herein, the first and second electric machines 114, 116 may be motor/generators, with a capacity to convert electrical energy into mechanical energy and vice versa. As such, the electric machines may hereafter also be referred to as motors and/or generators. The first and second electric machines 114, 116 may be electrically coupled to a traction battery 120 of vehicle 100 to both draw power from the traction battery 120 and provide electrical energy to be stored at the traction battery 120. The electric machines may be similarly configured, e.g., having similar operational speed and torque ranges, and thereby referred to as symmetric, or may have different speed and torque outputs, thereby referred to as asymmetric.

In one example, vehicle 100, when configured as an HEV, may be a power-split hybrid where the drive train 106 may be configured to decouple power delivered from the rotating source from a power demand, e.g., as indicated by an operator. As the power-split hybrid, vehicle 100 may be further adapted to provide power to the vehicle wheels 102 via two power-split pathways, each of the power-split pathways including power delivery through a first, electrical path via one or more of the electric machines as well as through a second, mechanical path via the engine. By dividing engine power flow, an efficiency of the drive train 106 is increased relative to a parallel or series hybrid configuration while allowing a footprint and peak power of the electric machines to be decreased.

In conventional power-split hybrid systems, a three node (with respect to a lever diagram representation) epicyclic gear train, or planetary, may be utilized at the transmission 108, thereby constraining a speed of one of the electric machines to a speed of the vehicle. In one example, a four-node planetary arrangement may be used instead, which may be input-coupled and constructed from various combinations of two three node levers. As an example, the four-node planetary arrangement may be a Ravigneaux gear set which couples a simple planetary to a compound planetary via a common ring gear. One node of the four-node planetary arrangement may be directed to a transmission output shaft 122, as shown in FIG. 1, and the remaining three nodes may be input nodes assigned to each of the two electric machines and the engine, where the two electric machines may similar and interchangeable. A dual power split mode hybrid power path is generated as a result of the four-node planetary arrangement, hereafter, input-coupled planetary (ICP). It will be noted that when the vehicle is an EV, the ICP may also be a three-node planetary arrangement coupled to transfer gears, as shown in FIGS. 9-13 and described further below. As such, the ICP-adapted drive train may operate as an electric variable transmission (EVT), providing power-split for hybrid applications. For the EVT, the electric machines may control its speed ratio, allowing the EVT to have a continuous selectivity of ratios.

Furthermore, the input node assigned to the engine may be located between the input nodes of the electric machines. This arrangement allows the drive train to operate in an EV mode with the engine off, e.g., the engine is not providing power to the vehicle wheels. In the EV mode or when vehicle 100 is an EV, the drive train may have IVT capabilities, enabling application of a motoring mode where both electric machines are pushing (e.g., as motors) on opposite sides of the output node. One of the electric machines may provide speed control and the other may provide torque control. Additionally, operation of the drive train in the modes described above may be achieved without use of clutches or additional hardware, enabling variable drive train operation to accommodate desired driving conditions.

Adjustment of the drive train between the various modes as well as control of operations within each mode may be executed based on a vehicle control system 124, including a controller 126, as shown in FIG. 1. Controller 126 may be a microcomputer, including elements such as a microprocessor unit, input/output ports, an electronic storage medium for executable programs and calibration values, e.g., a read-only memory chip, random access memory, keep alive memory, and a data bus. The storage medium can be programmed with computer readable data representing instructions executable by a processor for performing the methods described below as well as other variants that are anticipated but not specifically listed. In one example, controller 126 may be a powertrain control module (PCM).

Controller 126 may receive various signals from sensors 128 coupled to various regions of vehicle 100. For example, the sensors 128 may include sensors at the first and second electric machines 114, 116 to measure motor speed and motor temperature, a Hall effect sensor at the engine 112 to measure a crankshaft speed, a pedal position sensor to detect a depression of an operator-actuated pedal, such as an accelerator pedal or a brake pedal, speed sensors at the vehicle wheels 102, etc. Upon receiving the signals from the various sensors 128 of FIG. 1, controller 126 processes the received signals, and employs various actuators 130 of vehicle 100 to adjust engine and drive train operations based on the received signals and instructions stored on the memory of controller 126. For example, controller 126 may receive an indication of depression of the brake pedal, signaling a desire for decreased vehicle speed. In response, the controller 126 may command operation of at least one of the electric machines as a generator to recharge the traction battery 120.

Figure 3:
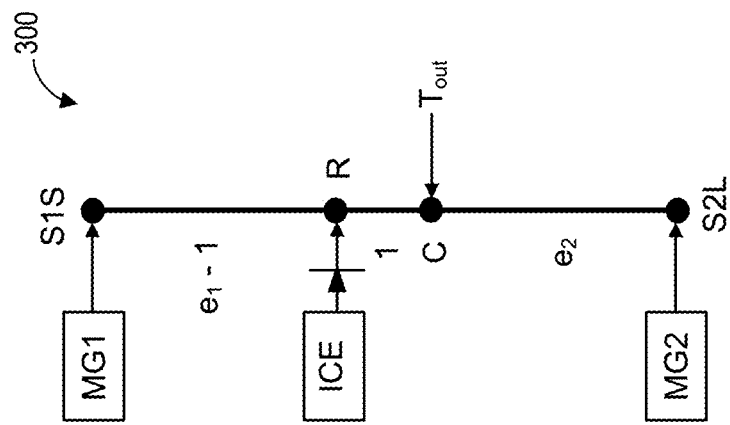
FIG. 3 shows a torque lever diagram for a second example of a dual motor input-coupled planetary arrangement which may be implemented in an e-drive of HEV.
Figure 2:
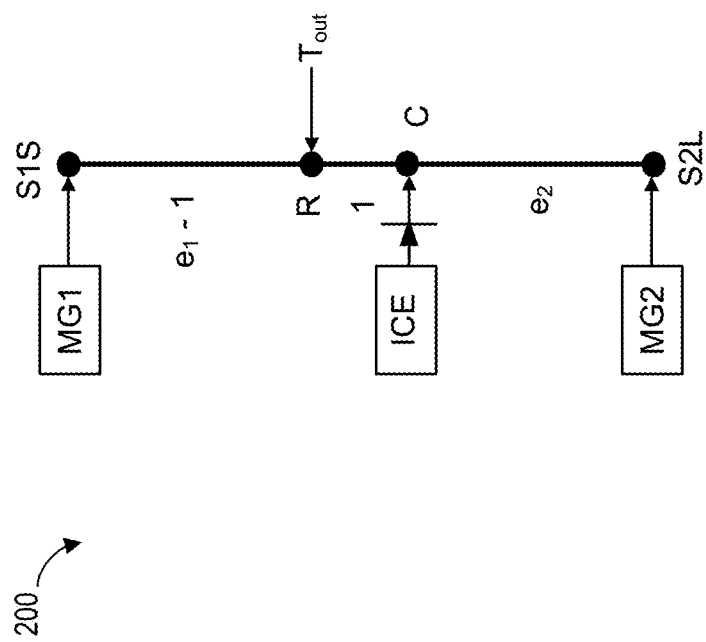
FIG. 2 shows a torque lever diagram for a first example of a dual motor input-coupled planetary (ICP) arrangement which may be implemented in an e-drive of a hybrid electric vehicle (HEV).

When implemented with a Ravigneaux gear set, an ICP of an HEV may have one of two configurations, as shown by torque lever diagrams in FIGS. 2 and 3. The Ravigneaux gear set includes a first, small sun gear (S1S), a ring gear (R), a carrier (C), and a second, large sun gear (S2S). The configurations shown in FIGS. 2 and 3 depict dual motor ICP arrangements which may be implemented in an e-drive of the HEV. For example, a first configuration 200 of implementation of the Ravigneaux gear set as an ICP of an e-drive is illustrated in FIG. 2 in a torque lever diagram, where the ring gear (R) is an output node ($T_{out}$), e.g., the ring gear outputs torque to an output shaft of the ICP, such as the output shaft 122 of FIG. 1. A first electric machine (MG1) is coupled to the first sun gear (S1S) of the Ravigneaux gear set, a second electric machine (MG2) is coupled to the second sun gear (S2L) of the Ravigneaux gear set, and an internal combustion engine (ICE) is coupled to the carrier (C) of the Ravigneaux gear set. An optional one-way clutch is positioned between the ICE and the carrier (C), which may allow for engine start-stop and EV operation, and inhibits backwards rotation of the engine by reaction torque during EV operation.

As shown in FIGS. 2 and 3, a ring gear to small sun gear ratio is denoted by $e_1$ and a ring gear to large sun gear ratio is denoted by $e_2$. The variables $e_1$ and $e_2$ may be applied to torque lever balance equations, as described further below, to maintain one or more components of the Ravigneaux gear, e.g., the first electric machine, the second electric machine, or the ICE, within its allowable speed range while providing a desired torque output at the output node of the ICP.

A second configuration 300 of a dual motor ICP arrangement is illustrated in FIG. 3 as a torque lever diagram where the carrier (C) is the output node ($T_{out}$) instead, e.g., the carrier outputs torque to an output shaft of the ICP, such as the output shaft 122 of FIG. 1. Similar to the first configuration 200 of FIG. 2, a first electric machine (MG1) is coupled to the first sun gear (S1S) of the Ravigneaux gear set and a second electric machine (MG2) is coupled to the second sun gear (S2L) of the Ravigneaux gear set. In contrast to the first configuration, however, an internal combustion engine (ICE) is coupled to the ring gear (R) of the Ravigneaux gear set. An optional one-way clutch is positioned between the ICE and the ring gear (R), to enable engine start-stop and EV operation, and inhibit backwards spinning of the engine during EV operation.

Both the first configuration 200 and the second configuration 300 may operate as a summing planetary with IVT capability to combine all three inputs onto the output node. For example, input torques from the ICE and both electric machines are summed onto a single planetary node, e.g., the ring gear in FIG. 2 and the carrier in FIG. 3. Alternatively, in other examples, both the first configuration 200 and the second configuration 300 may utilize a four-node lever formed of a planetary gear set other than the Ravigneaux gear set, including two simple planetary gears, a compound planetary, or a stepped planetary.

The dual motor configurations 200 and 300, shown in FIGS. 2 and 3, respectively, allow for both symmetric and asymmetric motor arrangement, where either the first electric machine or the second electric machine may be coupled to either of the sun gears. In other words, when the electric machines are symmetric, the first and second electric machines may provide similar speed and torque and may therefore be interchangeably coupled to either of the first sun gear or the second sun gear. When the electric machines are asymmetric, the first and second electric machines may have different speed and torque ranges. Implementation of asymmetric electric machines may allow for operation of the dual motor ICP arrangement across a wider range of e-drive applications. For example, operation at dual mechanical points (described further below with respect to FIG. 4) and at a virtual reaction node when the dual motor ICP arrangement is operated in an EV mode (also described further below), is enabled with asymmetric electric machines. The asymmetric dual motor arrangement is further addressed below with reference to FIGS. 9 and 16.

Transfer gears may be utilized to alter the effective motor characteristics as seen at the planetary nodes, e.g., the transfer gears may be configured as reduction elements to multiply torque or as overdrive elements to increase speed of either one or both of the motors (e.g., electric machines operating in a motoring mode). The transfer gears may therefore enable symmetric motors to be used as asymmetric motors. Examples of coupling of transfer gears to input nodes of the ICP are shown and described in FIGS. 9-13 for an EV and may be similarly applied to an HEV with an additional coupling of an ICE to an input node of the ICP.

The first and second configurations 200, 300 of FIGS. 2 and 3 for the drive train may be selected from a matrix providing all possible combinations of node connections in the Ravigneaux gear set, as shown below in Table 1.

TABLE 1

Selection Matrix for Electric Drive Train
with Ravigneaux planetary gear train

| Permutation | ICE | MG1 | MG2 | Output | mp | 2 motor EV |
|---|---|---|---|---|---|---|
| 1 | S1S | R | C | S2L | R, R | N |
| 3 | S1S | C | R | S2L | R, R | N |
| 2 | S1S | R | S2L | C | F, R | Y |
| 6 | S1S | S2L | R | C | F, R | Y |
| 4 | S1S | C | S2L | R | F, F | N |
| 5 | S1S | S2L | C | R | F, F | N |
| 7 | R | C | S1S | S2L | F, R | N |
| 9 | R | S1S | C | S2L | F, R | N |
| 10 | R | S1S | S2L | C | F, F | Y |
| 11 | R | S2L | S1S | C | F, F | Y |
| 8 | R | C | S2L | S1S | F, F | N |
| 12 | R | S2L | C | S1S | F, F | N |
| 13 | C | R | S1S | S2L | F, F | N |
| 15 | C | S1S | R | S2L | F, F | N |
| 16 | C | S1S | S2L | R | F, F | Y |
| 17 | C | S2L | S1S | R | F, F | Y |
| 14 | C | R | S2L | S1S | F, R | N |
| 18 | C | S2L | R | S1S | F, R | N |
| 19 | S2L | R | C | S1S | R, R | N |
| 21 | S2L | C | R | S1S | R, R | N |
| 20 | S2L | R | S1S | C | F, F | N |
| 24 | S2L | S1S | R | C | F, F | N |
| 22 | S2L | C | S1S | R | F, R | Y |
| 23 | S2L | S1S | C | R | F, R | Y |

While 24 permutations of a four-node lever are possible, where the nodes include one output and three input connections, permutations adhering to target conditions for highway navigation reduces the feasible permutations to the four permutations: 10, 11, 16, and 17. An additional four permutations (2, 6, 22, and 23) may also be used when off-highway navigation demanding both forward (F) and reverse (R) working cycles is desired. The conditions may include positioning of the electric machines (MG1, MG2) on opposite sides of the output, as shown in FIGS. 2 and 3, and enabling dual mechanical points (mp, described further below) with the same vehicle speed direction.

Permutations 10, 11, 16, and 17 may therefore be used for a vehicle where operation in the vehicle in a cruise mode is anticipated, allowing efficiency to be maximized during vehicle cruise. For example, the vehicle may be assembled during production with a permutation suitable for highway applications if the vehicle is to be marketed as such. For a vehicle where both forward and reverse cycles are primary operating modes of the vehicle, and/or minimal highway navigation is expected, the selection of ICP arrangement may be directed to a suitable permutation, such as permutations 2, 6, 22, and 23. As another example, vehicles with symmetric forward and reverse operating speed cycles, such as forklifts, construction vehicles, tractors, etc., may beneficially utilize arrangements with mechanical points on opposite side of a zero speed point (e.g., as described above for permutations 2, 6, 22, and 23).

Furthermore, the four permutations of Table 1 may be condensed to two permutations, corresponding to the configurations shown in FIGS. 2 and 3, where permutations 10 and 11 are equivalent to each other and the configuration of FIG. 3, and permutations 16 and 17 are mathematically equivalent to each other and the configuration of FIG. 2. In other driving applications, however, other permutations corresponding to additional configurations beyond those shown in FIGS. 2 and 3, may be suitable. For example, if the EV mode is not desired, then the 2 motor EV constraint is removed.

In an EVT, a mechanical point is an operating condition where the transmission is turning but a motor controlling a speed ratio of the transmission is stationary or near zero speed. Theoretical mechanical power consumption is zero, as shown in equation 1 where P is power, T is torque, and w is rotational speed:

$$P = T * \omega \qquad (1)$$

At the mechanical point, power flow through the transmission from an input to the output is entirely mechanical and may therefore be the most efficient speed ratio for mechanical power flow, in particular for steady state cruise. Little power is demanded for electric machine operation as a generator during power-split operation at the mechanical point, resulting in an electrical power ratio (EPR) of zero, where the EPR is defined as the ratio of generator power to engine power ($P_{gen}/P_{eng}$).

For the dual motor ICP arrangement, two mechanical points are present; a first mechanical point occurs where the first electric machine is at zero (or near zero) speed and a second mechanical point occurs where the second electric machine is at zero (or near zero) speed. As such, the e-drive may operate in a first mode where the engine and the first electric machine participate in a power split mode of operation. In the first mode, the first electric machine may operate as a generator and provide speed control, thereby setting a speed of the engine and the second electric machine, which may each provide torque control. Alternatively, the dual motor ICP arrangement may be operated in a second mode where the engine and the second electric machine participate in a power split mode of operation. In the second mode, the second electric machine may operate as a generator and provide speed control while the engine and first electric machine provide torque control. Operation of the dual motor ICP arrangement at the first mechanical point is thus enabled in the first power split mode (hereafter, Mode 1), and operation at the second mechanical point is enabled in the second power split mode (hereafter, Mode 2).

Figure 4:
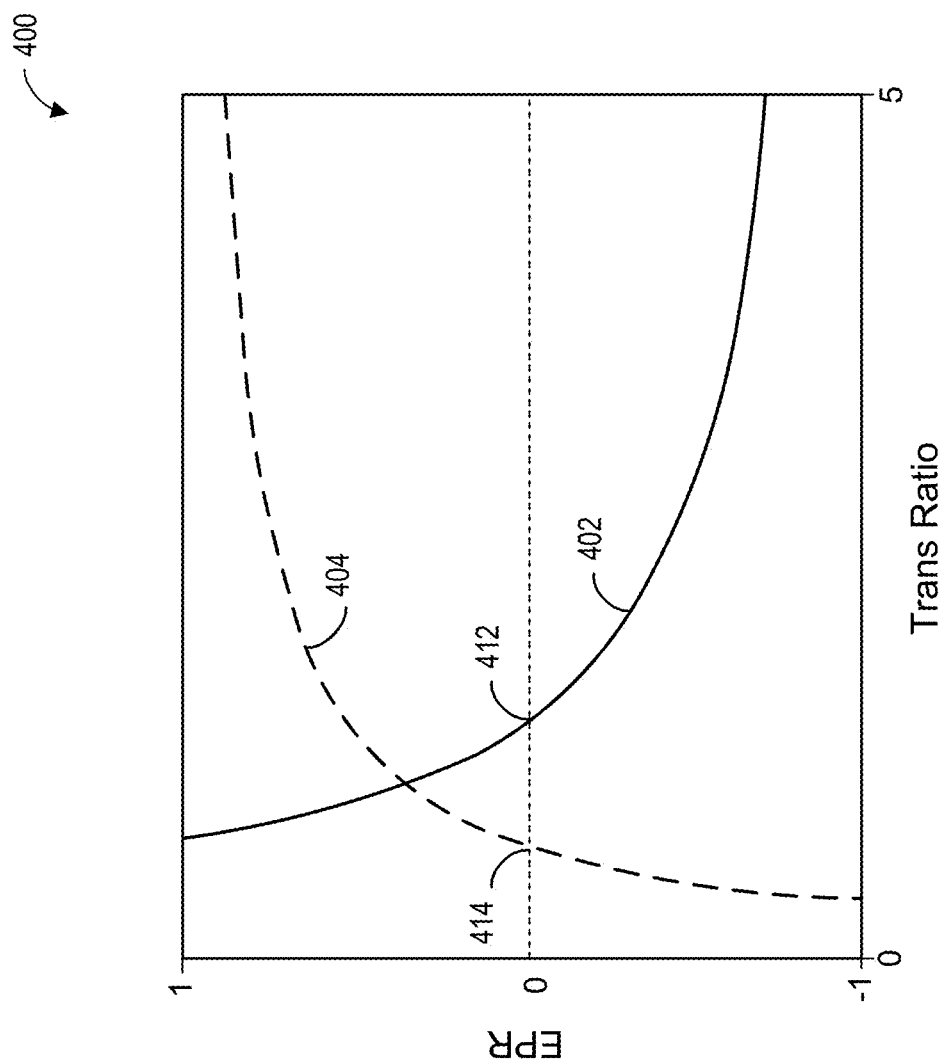
FIG. 4 shows a graph illustrating a relationship between electrical power ratio (EPR) and transmission ratio for a first hybrid power split mode and a second hybrid power split mode of a dual motor ICP arrangement, such as the arrangements of FIGS. 2 and 3.

Unlike other drive train arrangements, such as multi-mode power splits, operation either of the first and second mechanical points is achieved in the four-node arrangement without clutches or additional hardware. Planetary ratios may be selected to optimize each of the mechanical points to a specific vehicle speed range. The dual mechanical points are depicted in FIG. 4 by graph 400 which shows a relationship between EPR and a transmission ratio for a dual motor ICP arrangement, e.g., as shown in FIG. 2 or FIG. 3, where the transmission ratio is defined as a ratio of an engine rotational speed to an output rotational speed ($\omega_{eng}/\omega_{out}$).

Plot 402 of graph 400 represents operation of the dual motor ICP arrangement in Mode 1, as described above, and plot 404 depicts operation of the dual motor ICP arrangement in Mode 2. Plots 402 and 404 may have inverse relationships. Mechanical points may occur where EPR is zero. For example, a first mechanical point 412 is indicated where EPR is zero for plot 402 and a second mechanical point 414 is indicated where EPR is zero for plot 404.

For graph 400, a high transmission ratio indicates vehicle launch and a low transmission ratio indicates high vehicle speed, e.g., cruising. As such, the dual motor ICP arrangement may be commanded to operate at the first mechanical point 412 during vehicle launch to maximize mechanical efficiency. When the transmission ratio is low, the dual motor ICP arrangement may be commanded to operate at the second mechanical point 414 to maximize mechanical efficiency. Thus, by providing two mechanical points, efficiency may be increased across a wider range of vehicle speeds than a conventional arrangement where motor speed is defined by vehicle speed.

During vehicle launch, EPR may be high, as shown in graph 400, and, as such, the electric machines may be used to provide vehicle launch assist. A hybrid control algorithm may be specified to determine a usage of the electric machines versus the engine. The algorithm may be a heuristic, e.g., rule-based algorithm, or an equivalent consumption minimization strategy (ECMS) algorithm. In either instance, prioritization of operation of the electric machines (as motors) or of the engine may be selected based on which route provides greatest fuel economy. This may be determined based on, for example, motor loss maps and an engine brake-specific fuel consumption (BSFC) map.

The four-node dual motor ICP arrangement allows for numerous operating modes for an HEV. For example, as shown in Table 2, which corresponds to the Ravigneaux planetary gear set configuration of FIG. 2, eight operating modes are possible.

operate with a greater availability of modes than a conventional power-split drive train arrangement.

As described above, the operating modes shown in Table 2 include Mode 1, the first power-split mode, and Mode 2, the second power-split mode. The first electric machine and the second electric machine may be asymmetric, where the second electric machine may operate at a higher/wider speed and torque range than the first electric machine. As a result, operation in Mode 2 includes both a cruise sub-mode and an acceleration (e.g., vehicle launch) sub-mode, which may be achieved by inverting the speed and torque sign of the first electric machine. The operating modes further include a two motor EV mode and a two motor HEV mode where both the electric machines are operating as motors. In the EV mode, the vehicle operates exclusively based on electrical power and control methods for the EV mode are described further below, with respect to FIGS. 9-20 and 23. In the HEV mode, the electric machines are providing torque assist to the engine which may be desirable during high torque demand, such as during vehicle launch, uphill navigation, etc.

A reverse power-split mode may be utilized when the vehicle is navigated in reverse, e.g., travelling in reverse gear. In addition, the operating modes include regenerative braking modes during which both electric machines are operated as generators. An EV regenerative braking mode may be used when a tip-in at a brake pedal occurs while the engine is off, e.g., disconnected from the ICP, and an HEV regenerative braking mode may be used when a tip-in at a brake pedal occurs with the engine on.

Figure 6:
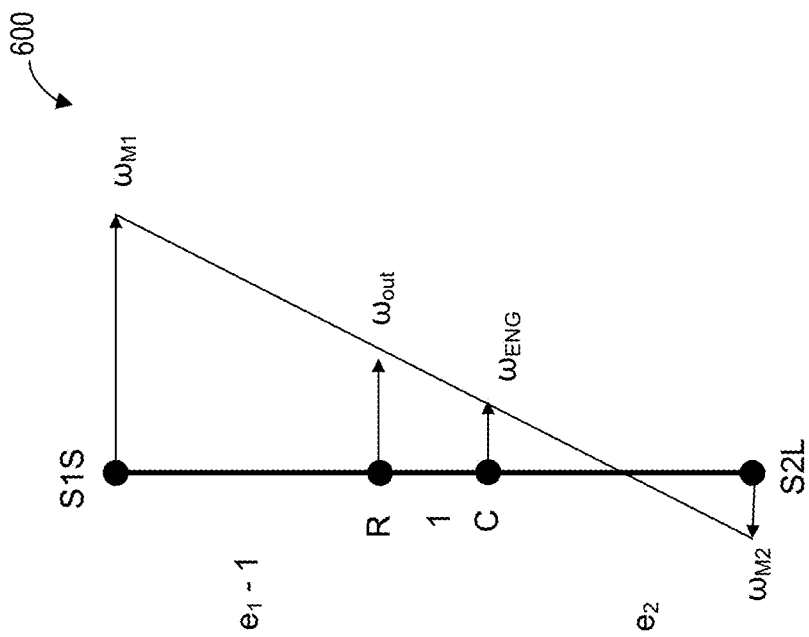
FIG. 6 shows a speed lever diagram for the dual motor ICP arrangement of FIG. 2, operating in the second hybrid power split mode.
Figure 5:
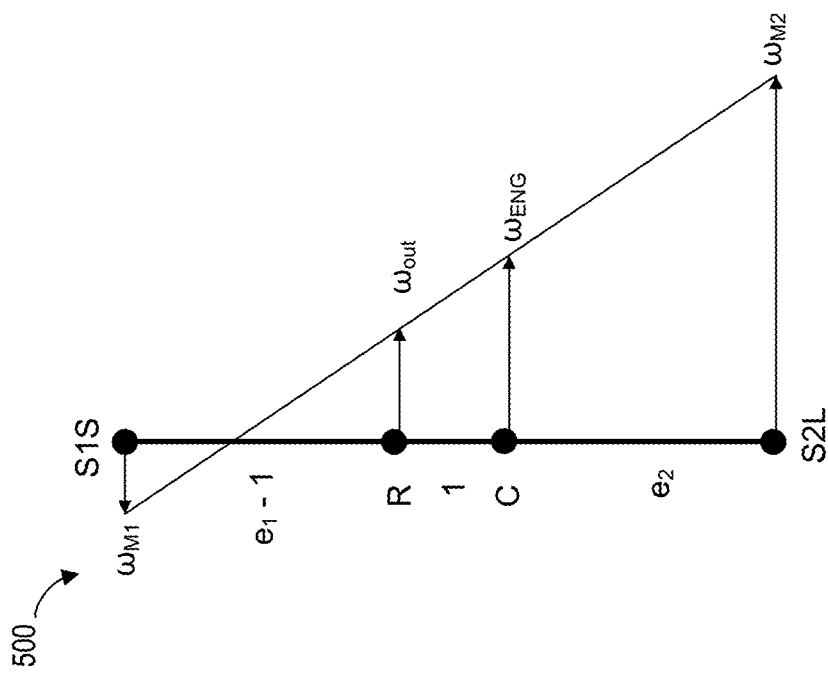
FIG. 5 shows a speed lever diagram for the dual motor ICP arrangement of FIG. 2, operating in the first hybrid power split mode.
Figure 7:
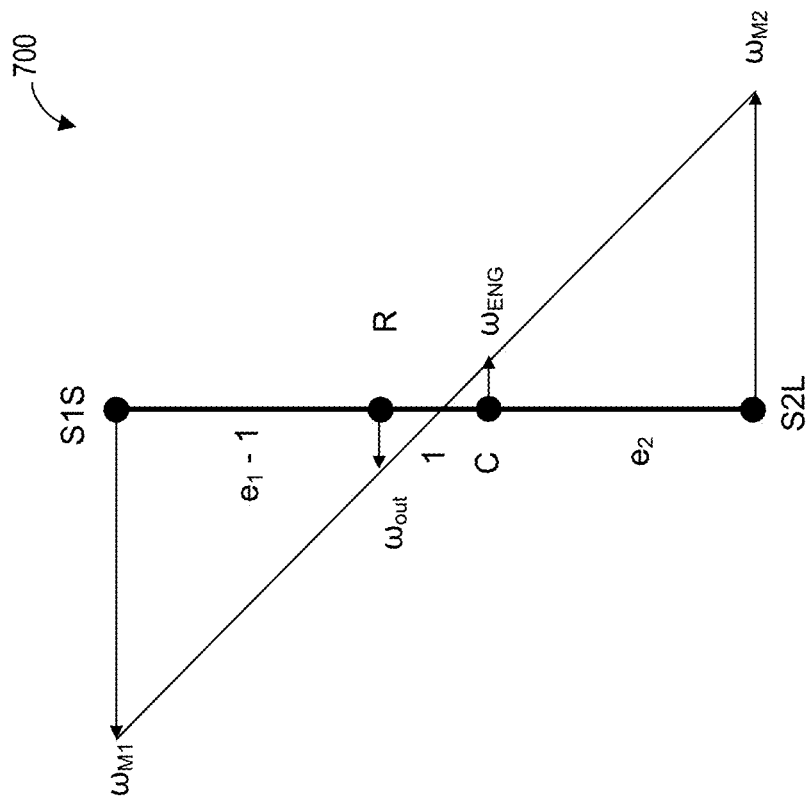
FIG. 7 shows a speed lever diagram for the dual motor ICP arrangement of FIG. 2, operating in a reverse hybrid power split mode.

Speed lever diagrams for a dual motor ICP arrangement are illustrated in FIGS. 5-7 for select operating modes shown in Table 2. The dual motor ICP arrangement may be configured as shown in FIG. 2 with an engine coupled to a carrier of the ICP and an output shaft coupled to a ring gear of the ICP. A torque output at the ring gear may be a sum of torque input by a first electric machine, a second electric machine and the engine, where the torque output of each input component is dependent on its operating speed. For example, a first speed lever diagram 500 is depicted in FIG. 5 corresponding to Mode 1, where M1 is the first electric machine operating as a generator and M2 is the second electric machine operating as a motor. A second speed lever

TABLE 2

Operating modes for four-node ICP drive train

| Mode | MG1 function | ω1 | T1 | MG2 function | ω2 | T2 | ICE |
|---|---|---|---|---|---|---|---|
| 2 motor EV | motor | + | + | motor | + | + | Off |
| Mode 1 power-split | generator | − | + | motor | + | + | On |
| Mode 2 cruise power-split | motor | + | + | generator | + | − | On |
| Mode 2 accel power-split | motor | + | + | generator | − | + | On |
| 2 motor HEV | motor | + | + | motor | + | + | On |
| Reverse power-split | motor | − | − | generator | + | − | On |
| EV Regenerative braking | generator | + | − | generator | + | − | Off |
| HEV Regenerative braking | generator | + | − | generator | + | − | On |

As depicted in Table 2, when either of a first electric machine and a second electric machine (e.g., MG1 and MG2, respectively) operate as a motor, rotational speed and torque are both positive, e.g., applied in the same direction. As generators, the rotational speed and the torques of the electric machines are in opposite direction (e.g., one is positive, one is negative). The internal combustion engine (ICE) may be on, as in HEV operation, or off, as in EV operation. The four-node ICP thus allows the drive train to diagram 600 is depicted in FIG. 6 corresponding to Mode 2, where M1 operates as a motor and M2 operates as a generator.

A speed output at the ring gear may be held constant between the first speed lever diagram 500 and the second speed lever diagram 600. As such, the torque output of the ICP is maintained at a desired amount of torque. In order to satisfy the speed lever of FIG. 5, the first electric machine may set a speed of the second electric machine and the engine. For example, a speed of the first electric machine may be determined based on a battery SOC. As the speed of first electric machine varies, the speed lever is adjusted, resulting in corresponding changes in speeds of the engine and the second electric machine. As one example, the speed of the first electric machine may decrease to zero, resulting in operation at a first mechanical point, as described above. Adjustment of the speed lever may drive a reduction in both engine speed and the speed of the second electric machine, resulting in a switching point where operation in Mode 1 may switch to operation in Mode 2, e.g., as depicted in FIG. 6. In Mode 2, M2 provides speed control for the engine and M1.

A third speed lever diagram 700 is depicted in FIG. 7 corresponds to the Reverse power-split of Table 2, where M1 acts as a motor and M2 acts as a generator. The rotational speed of the output node, e.g., to the output shaft, is opposite of the rotational speed of the output node in FIGS. 5 and 6. The speed lever of the third speed lever diagram 700 may be similarly adjusted, with M2 providing speed control.

Control of the dual motor ICP arrangement may be directed to a speed domain, a torque domain, and a power domain. For example, speed levers, as shown in FIGS. 5-7, may be derived based on a speed at one of the input nodes of the ICP, as described above. The remaining two inputs may be used for torque control. Conditions at the switching point between Mode 1 and Mode 2 may meet demands of speed equations for a fixed output speed, for example, as shown by a speed control equation 2 for Mode 1 and a speed control equation 3 for Mode 2 for the dual motor ICP arrangement of FIG. 2:

$$\omega_1 = \omega_{ring}*e_1 - w_{eng}*(e_1-1) \quad (2)$$

$$\omega_2 = \omega_{eng}*(e_2+1) - \omega_{ring}*e_2 \quad (3)$$

Similar speed control equations may be obtained for the dual motor ICP arrangement of FIG. 3 where the carrier is the output node.

In the torque domain, torques generated by each of the input components, e.g., the electric machines and the engine, are combined at the output node of the ICP. To maintain operation of each input component within its respective allowable speed range, a lever balance equation may be satisfied. For example, equation 4 shows the lever balance equation for a carrier out configuration, as shown in FIG. 3, and equation 5 shows the lever balance equation for a ring out configuration, as shown in FIGS. 2 and 5-7:

$$T_e = T_2*(e_2) - T_1*(e_1) \quad (4)$$

$$T_e = T_1*(e_1-1) - T_2*(e_2+1) \quad (5)$$

where $e_1$ is the ratio of the ring gear to the small sun gear in the Ravigneaux planetary gear set, $e_2$ is the ratio of the ring gear to the large sun gear, $T_e$ is a torque output of the engine, $T_1$ is a torque output of the first electric machine, and $T_2$ is a torque output of the second electric machine.

The lever balance equations for torque may be intermittently disobeyed during transient conditions. Multiple expressions may be derived for output torque in terms of two of the three input components. These expressions may vary by permutation, e.g., the permutations shown in Table 1. However, for all permutations the torque relationship shown by equation 6 below is satisfied, where $T_{out}$ is a torque at the output node of the ICP. Therefore, a torque control algorithm implemented at a controller may satisfy an output torque request from the sum of the three individual input components while simultaneously satisfying equations 4 and 5.

$$T_{out} = T_e + T_1 + T_2 \quad (6)$$

The 24 permutations of Table 1 show all potential arrangements of three inputs and one output connected to a four node-lever. Down selection criteria, including torque and speed conditions, are applied to each of the permutations to validate that two motor EV operation is possible. When the torque level balance equations and the speed control equations are satisfied and operation of the motors generates torque in the same direction, permutations 10, 11, 16, and 17 of Table 1 may fulfil both the torque and speed domain criteria.

Figure 8:
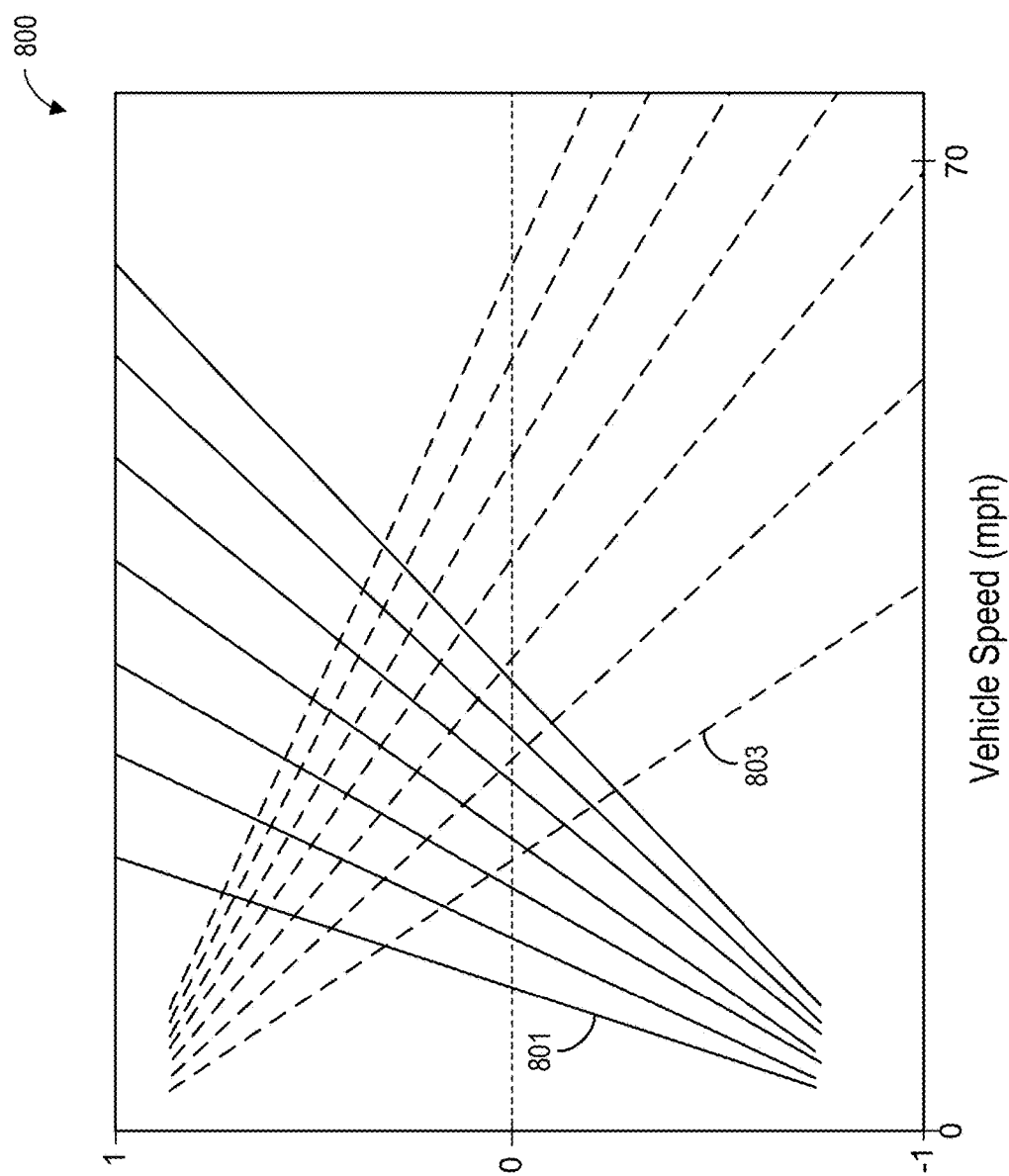
FIG. 8 shows a graph plotting relationships between engine speed, EPR, and vehicle speed for a dual motor ICP arrangement.

In one example, a mode shift strategy may be applied to minimize EPR during vehicle operation, thereby operating the drive train of the vehicle at or close to one of the mechanical points when possible. For example, as shown in FIG. 8, a graph 800 depicts a relationship between vehicle speed, engine speed, and EPR for the ring out configuration of the dual motor ICP arrangement shown in FIG. 2. Solid lines depict engine speeds in Mode 1, e.g., line 801 is a minimum engine idle speed in Mode 1. As an example, the minimum engine idle speed may be 800 rpm. Dashed lines depict engine speeds in Mode 2, e.g., line 803 is a minimum engine speed in Mode 2, where the ICP drive train operating mode has switched from Mode 1 to Mode 2 and the functions of M1 and M2 have switched. Engine speed increases from left to right with the left most speed being the minimum engine idle speed (e.g., a dashed line and a solid line furthest to the left) and the right most speed (e.g., a dashed line and a solid line furthest to the right) being a maximum engine speed. In one example, the maximum engine speed may be 2600 rpm.

Within the speed domain, the relationship among vehicle speed, engine speed, and EPR illustrates a generalized mode shift strategy. For example, EPR is minimized (e.g., near or at zero) where the vehicle launches (e.g., low vehicle speed), in Mode 1 at a first, low engine speed (line 801), where Mode 1 intersects with a zero value of EPR. The engine speed progressively rises, with each solid line, in a direction from left to right. At a threshold vehicle speed higher than the vehicle launch speed, the EVT switches to Mode 2 when line 803 intersects with the zero value of EPR with the engine operating at the first speed. Engine speed may therefore be reduced in order to switch modes. An overall goal of the mode shift strategy is to keep EPR negative and close to zero, which minimizes generator power required to react engine torque and may result in the highest fraction of engine power delivered through the mechanical path to the drive wheels given the speed, power, and torque constraints of each of the three inputs.

In the power domain, two constraints may be applied to control operation of the dual motor ICP arrangement. For example, power from the electric machine in the generator mode may not exceed engine power. Additionally, the speed control equation may adapt the speed set point of the electric machine providing speed control based on battery power demands to help control power flow and torque balance in steady state operation. As an example, during steady state cruise, system efficiency (e.g., determined based on individual efficiencies of each electric machine and a power fraction through each electric machine) may be maximized when the vehicle is propelled exclusively via engine power. The electric machine operating as a generator may produce torque to offset engine torque with the electric machine operating as a motor set to zero torque. Although mechanical point operation occurs at zero speed, running the electric machine operating as the generator may lead to stalling of the electric machine due to concentrated heat generation. Thus, the electric machine operating as the generator is run at a low, non-zero speed where a target amount of torque and commanded speed determine power output of the generator. Therefore, to control battery SOC and auxiliary power draws, the speed control routine alters speed to meet the overall power demands.

Control of the dual motor ICP arrangement may further include an adaptive control strategy where a search algorithm may determine a suitable combination of torques generated by the electric machines and the engine to meet a torque demand. A weighting function, s, may modify an initial engine torque, $T_e$ according to equation 7 when the dual motor ICP arrangement is operated in Mode 1:

$$T_e = s * T_{e\_max} \quad (7)$$

A target torque of the first electric machine (operating as a generator) may be determined based on the weighted initial engine torque, gear ratios of the ICP, and a torque demand at the output node of the ICP. If the resulting target torque output of the first electric machine is less than zero or greater than a maximum allowable torque of the first electric machine, s may be reduced by an adaptation factor and the initial engine torque, and the target torque of the first electric machine may be recalculated until an allowable result is obtained. A target torque of the second electric machine (operating as a motor) may be similarly estimated based on the weighted initial engine torque, gear ratios of the ICP, and a torque demand at the output node of the ICP. The weighting function, s, may be similarly reduced by the adaptation factor if the target torque of the second electric machine is estimated to be less than zero or greater than a maximum allowable torque of the second electric machine.

The weighting function, s, may initially be set to one, which maximizes a torque contribution from the engine. Alternatively, s may initially be set to less than one which increases a reliance on the electric machines for providing torque. As such, a starting value for s may be varied based on various inputs such as battery SOC, vehicle speed, operator demand for torque, etc.

In this way, a dual motor ICP arrangement may be implemented in an e-drive of an HEV to provide propulsion of the HEV without relying on clutches or hydro-mechanical devices. The ICP may be a Ravigneaux gear set, in one example, enabling formation of a four-node lever to add a DOF to the e-drive, thereby freeing a speed of the dual motors (e.g., electric machines) from vehicle speed. Operation of the dual motor ICP arrangement in a power split mode may be controlled by an approach that includes setting one of input component of the ICP as a speed control device, thereby assigning torque control to the other two input components. Incorporation of two motors enables operation at two mechanical points, thereby increasing mechanical efficiency of the e-drive. Further details of how the dual motor ICP arrangement may be operated according to the control strategies described above are shown below with reference to FIGS. 21-23. Operation of the dual motor ICP arrangement may also include a pure electric mode where the engine is disconnected from the ICP.

The four-node dual motor ICP arrangement described with reference to FIGS. 2-8 may enable HEV operation in the EV mode with the engine turned off and power delivered to a vehicle's wheels exclusively by electric machines. The following discussion of a drive train for an EV, e.g., an e-drive, with an additional DOF to decouple motor speed from vehicle speed thereby may also be implemented in the HEV when the HEV is operating in the EV mode. By implementing an ICP with a dual motor arrangement at the drive train of the EV (or HEV), both EVT and IVT operation are enabled, as well as single motor torque multiplication.

For example, when the dual motor arrangement is coupled to the ICP, power is applied to an output of the ICP from two sources while allowing continuous modulation of speed ratios, thus allowing the e-drive to operate as an EVT. The dual motor ICP arrangement may also operate at a motor speed ratio of zero, thereby allowing an infinite number and range of gear ratios for IVT applications. EVT and IVT operation is enabled with an e-drive that does not rely on fixed gear ratios.

Figure 9:
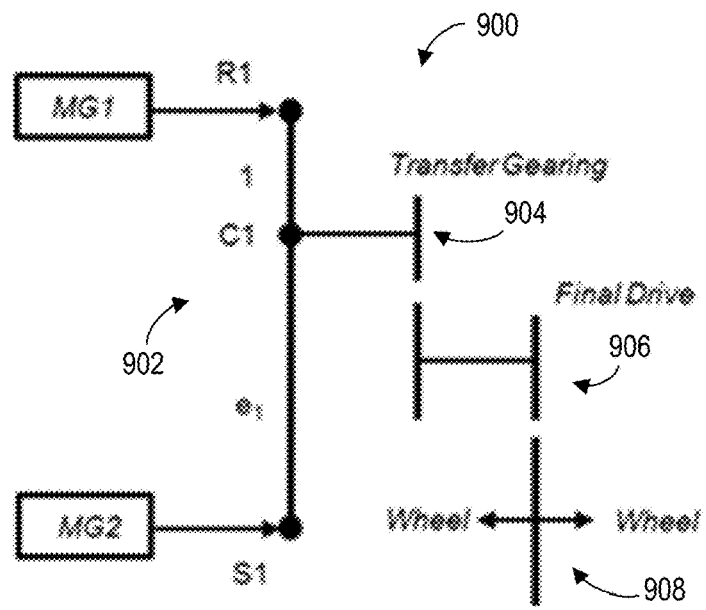
FIG. 9 shows a torque lever diagram of a first example of a configuration of a dual motor ICP arrangement for an electric vehicle (EV) or the HEV operating in an EV mode.

The dual motor ICP arrangement for an EV may have a variety of configurations. As shown in FIG. 9 in a first torque lever diagram 900, a simple planetary gear set 902 may be used with a first electric machine (MG1) coupled to a ring gear (R1) of the planetary gear set 902 and a second electric machine (MG2) coupled to a sun gear (S1) of the planetary gear set 902. A complete powerpath is illustrated in FIG. 9, with a carrier (C1) of the planetary gear set 902 connected to transfer gearing 904 which is coupled to a final drive 906. The final drive 906 is directly coupled to wheels 908 of a vehicle. A ring gear to sun gear ratio is denoted by $e_1$.

In the arrangement shown in FIG. 9, the electric machines may be asymmetric, e.g., the electric machines have different operating speed and torque ranges. For example, the first electric machine may be a low speed, high torque device operated in a torque control mode. The second electric machine may be a comparatively high speed, low torque device operated in speed control mode. Torques from both electric machines are summed onto a single planetary node, e.g., the carrier, which is configured as an output of the drive train. Speeds of each of the electric machines are decoupled from, e.g., independent of, vehicle speed and when the electric machines are operated in opposite directions, the drive train is fully and symmetrically reversible and able to seamlessly switch directions.

Figure 10:
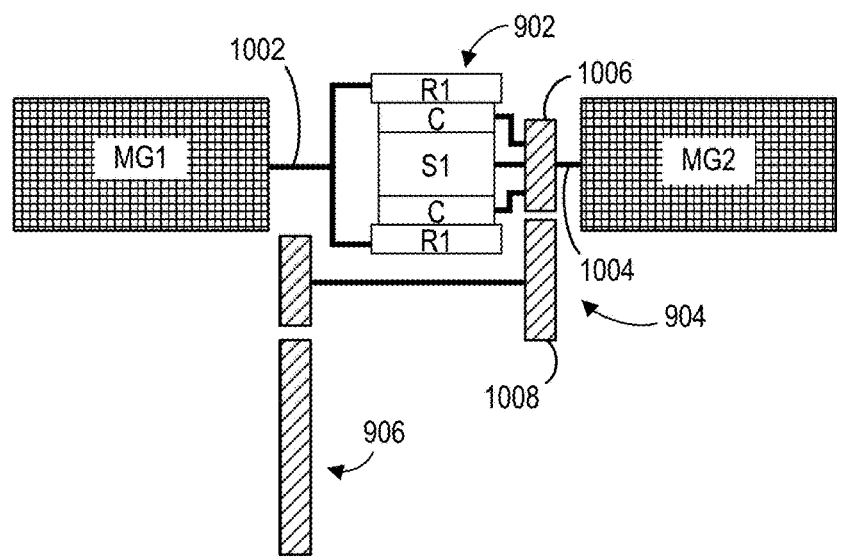
FIG. 10 shows a layout for the configuration of FIG. 9.

An example of a layout for the drive train arrangement of FIG. 9 is depicted in FIG. 10 as a block diagram. Therein, the torque input of the first electric machine (MG1) is communicated to the ring gear (R1) through a first shaft 1002 of the first electric machine and the torque input of the second electric machine (MG2) is communicated to the sun gear (S1) through a second shaft 1004 of the second electric machine. The torque inputs of the electric machines are transmitted cumulatively via the carrier (C) of the planetary gear set 902 to the transfer gearing 904. The transfer gearing 904 may include a first gear 1006 and a second gear 1008 where the first gear 1006 may be hollow to allow the shaft 1004 of the second electric machine to pass therethrough. The second gear 1008 of the transfer gearing 904 is meshed with the gearing of the final drive 906. It will be appreciated that the layout of FIG. 10 is a non-limiting example and other examples may include variations in a configuration of the transfer gearing 904 and the final drive 906.

Figure 11:
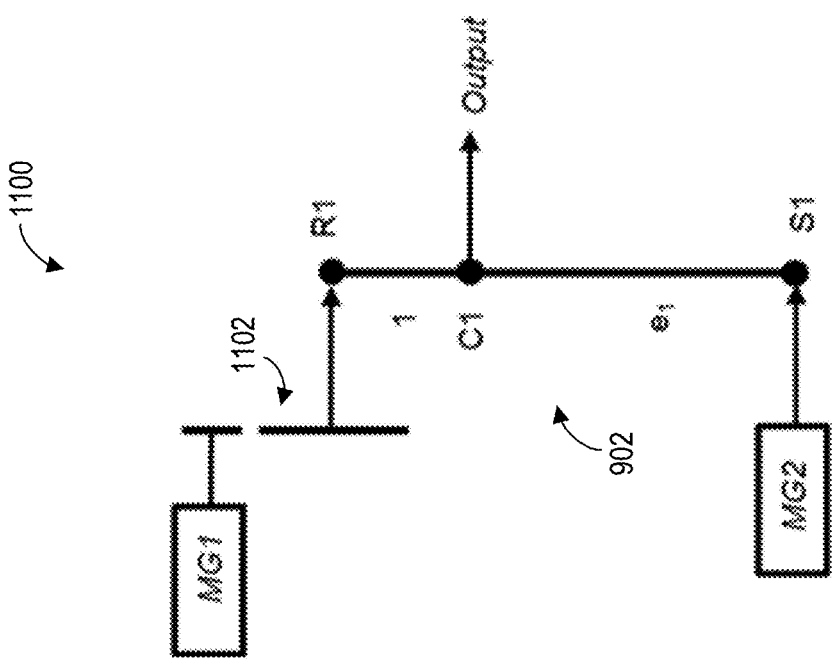
FIG. 11 shows a torque lever diagram for a second example of a configuration of a dual motor ICP arrangement for the EV or the HEV operating in an EV mode.

The layout depicted in FIG. 10 may be used for either front or rear wheel drives for light and commercial vehicle applications. Furthermore, additional configurations of a dual motor ICP arrangement for an EV are illustrated in FIGS. 11-15 with the final drive omitted. For example, as shown in FIG. 11, a second torque lever diagram 1100 depicts the second electric machine coupled to the sun gear of the simple planetary gear set 902 and the carrier as the output node, similar to the arrangement shown in FIG. 9. The first electric machine, however, is indirectly coupled to the ring gear through a transfer gear 1102.

Figure 12:
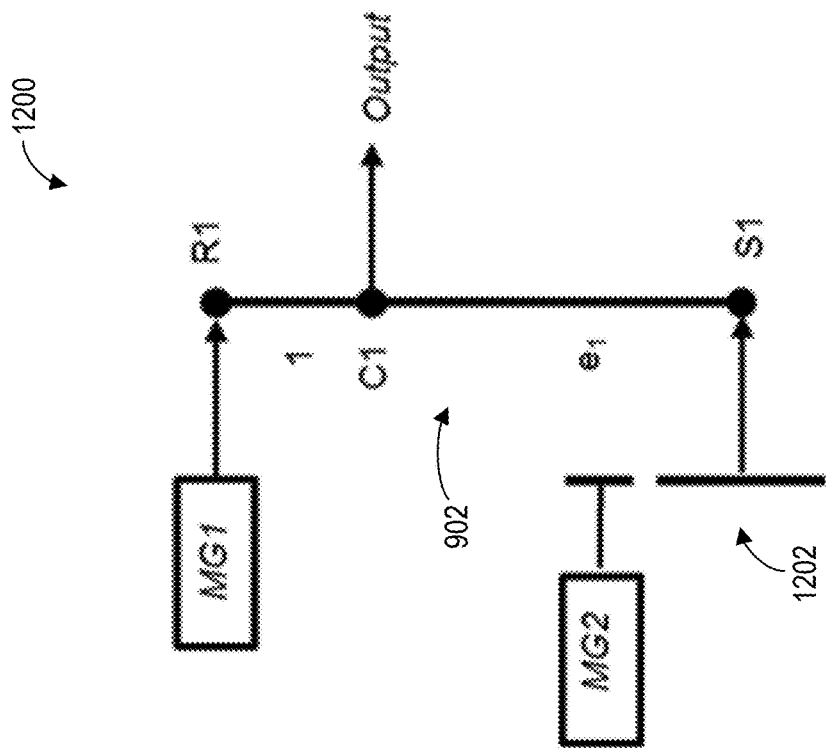
FIG. 12 shows a torque lever diagram for a third example of a configuration of a dual motor ICP arrangement for the EV or the HEV operating in the EV mode.
Figure 13:
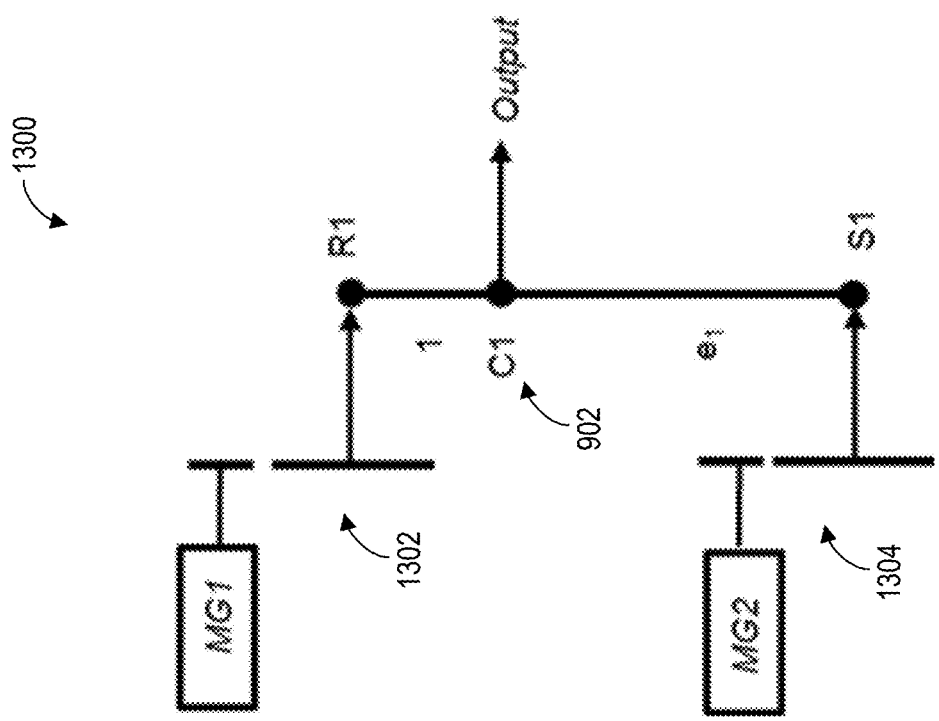
FIG. 13 shows a torque lever diagram for a fourth example of a configuration of a dual motor ICP arrangement for the EV or the HEV operating in the EV mode.

In an alternate arrangement, a third torque lever diagram 1200 shown in FIG. 12 depicts the first electric machine directly coupled to the ring gear and the second electric machine indirectly coupled to the sun gear through a transfer gear 1202. In another example, as shown in FIG. 13 in a fourth torque level diagram 1300, the planetary gear set 902 is shown indirectly coupled to both of the first and second electric machines. The first electric machine is coupled to the ring gear through a first transfer gear 1302 and the second electric machine is coupled to the sun gear through a second transfer gear 1304.

The different configurations of FIGS. 9-13, allow the dual motor inputs (e.g., the first and second electric machines) to be symmetric or asymmetric. In other words, the first and second electric machines may provide similar speed and torque, and may therefore be interchangeable, or may have different speed and torque ranges. When the electric machines are symmetric, coupling of the transfer gear to one of the electric machines allows modification of the torque/speed input of that electric machine to the planetary gear set. The symmetric electric machines with at least one transfer gear therefore provides an analogous operation as asymmetric electric machines.

The use of asymmetric motor input, via either similarly configured electric machines with transfer gearing or differently configured electric machines, allows the inputs to provide torque and speed output across a wider range than, for example, symmetric electric machines without transfer gearing. As shown in FIG. 16, a graph 1600 plots motor torque relative to motor speed for an asymmetric dual motor arrangement. A first motor (which may be either the first or second electric machine of FIGS. 9-15), plotted as M1 in graph 1600, may have a peak torque curve 1602 and a continuous torque curve 1604. The peak torque is a maximum torque generated over a short period of time while the continuous torque is an amount of torque the motor can generate over an indefinite period of time. A peak torque curve 1606 and a continuous torque curve 1608 for a second motor (M2) may be lower than the corresponding curves of the first motor. As such, by using asymmetric motors, a larger range of torque may be delivered at given motor speeds.

The use of at least one transfer gear shown in FIGS. 9-13, either coupled to a single electric machine or both electric machines, may be a reduction element allowing torque to be multiplied during transfer from the electric machines to the planetary gear set. In some instances, the transfer gear may also be an overdrive element used to increase a rotational speed transmitted from the electric machine to the corresponding planetary gear, particularly at a node connecting the electric machine to the sun gear, which may be a high-speed node of the planetary gear set. The transfer gear enables modification of speed/torque provided by the power sources (e.g., the electric machines) and transmitted to the elements receiving the power (e.g., wheels of the vehicle) via the planetary gear set and may itself be a planetary gear set if a coaxial arrangement of the drive train is desired. As another example, the transfer gear may be configured as helical gears if a different type of axial arrangement is desired. The transfer gear may also be included in more complex dual motor ICP arrangements.

Figure 14:
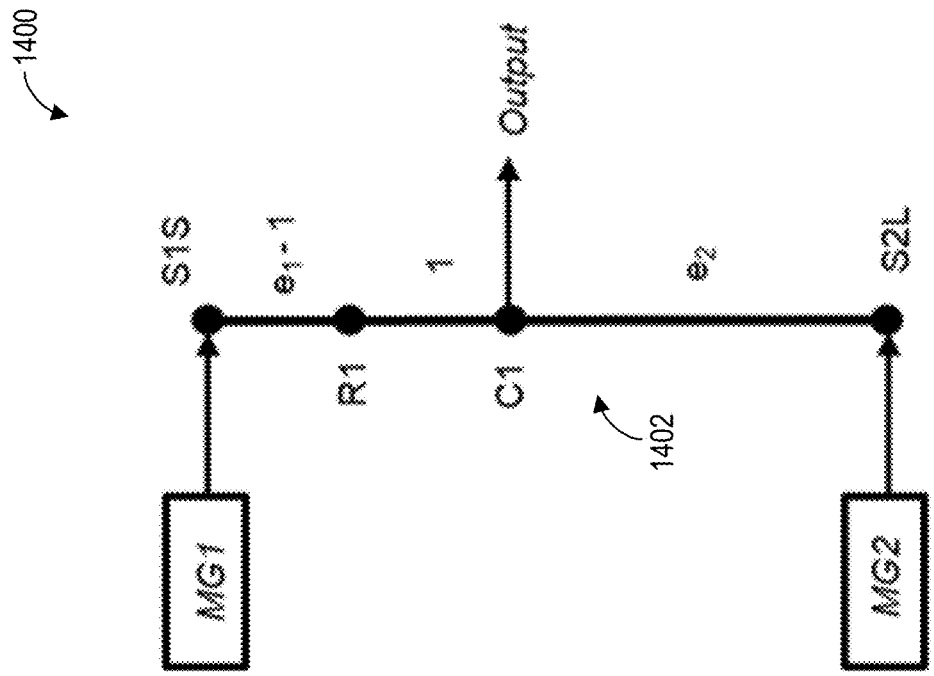
FIG. 14 shows a torque lever diagram for a fifth example of a configuration of a dual motor ICP arrangement for the EV or the HEV operating in the EV mode.

For example, a Ravigneaux planetary gear set may be employed in the dual motor ICP arrangement where torque inputs are similarly summed at an output node of the Ravigneaux planetary gear set. A fifth torque lever diagram 1400 of a dual motor ICP arrangement for an EV is depicted in FIG. 14 with a Ravigneaux planetary gear set 1402. The Ravigneaux planetary gear set 1402 includes a first input node at a first, small sun gear (S1S) to which the first electric machine (MG1) is coupled, a second input node at a second, large sun gear S2L to which the second electric machine (MG2) is coupled, and an output node at a carrier (C1). The first and second electric machines may be symmetric or asymmetric, as described above. The carrier may output torque from the electric machines to the vehicle wheels through a final drive, as shown in FIGS. 9-10. In some examples one or more transfer gears may be positioned between the carrier gear and the final drive as well as between one or more of the electric machines and its respective input node, as shown in FIGS. 9-13. A ring gear (R1) of the Ravigneaux planetary gear set 1402 may be a floating node, e.g., not coupled to any input or output components. By including the floating node, full IVT operation without use of clutches is enabled. In some examples, the floating node may be grounded with a brake clutch to provide torque multiplication which, when combined with a fixed relationship between output speed and vehicle speed, results in a fixed speed ratio mode.

Figure 15:
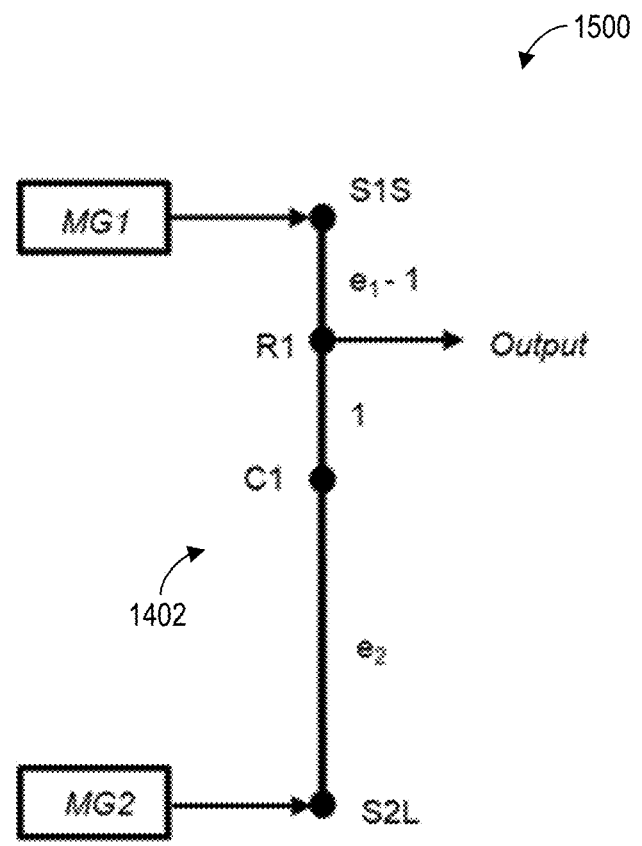
FIG. 15 shows a torque lever diagram for a sixth example of a configuration of a dual motor ICP arrangement for the EV or the HEV operating in the EV mode.
Figure 16:
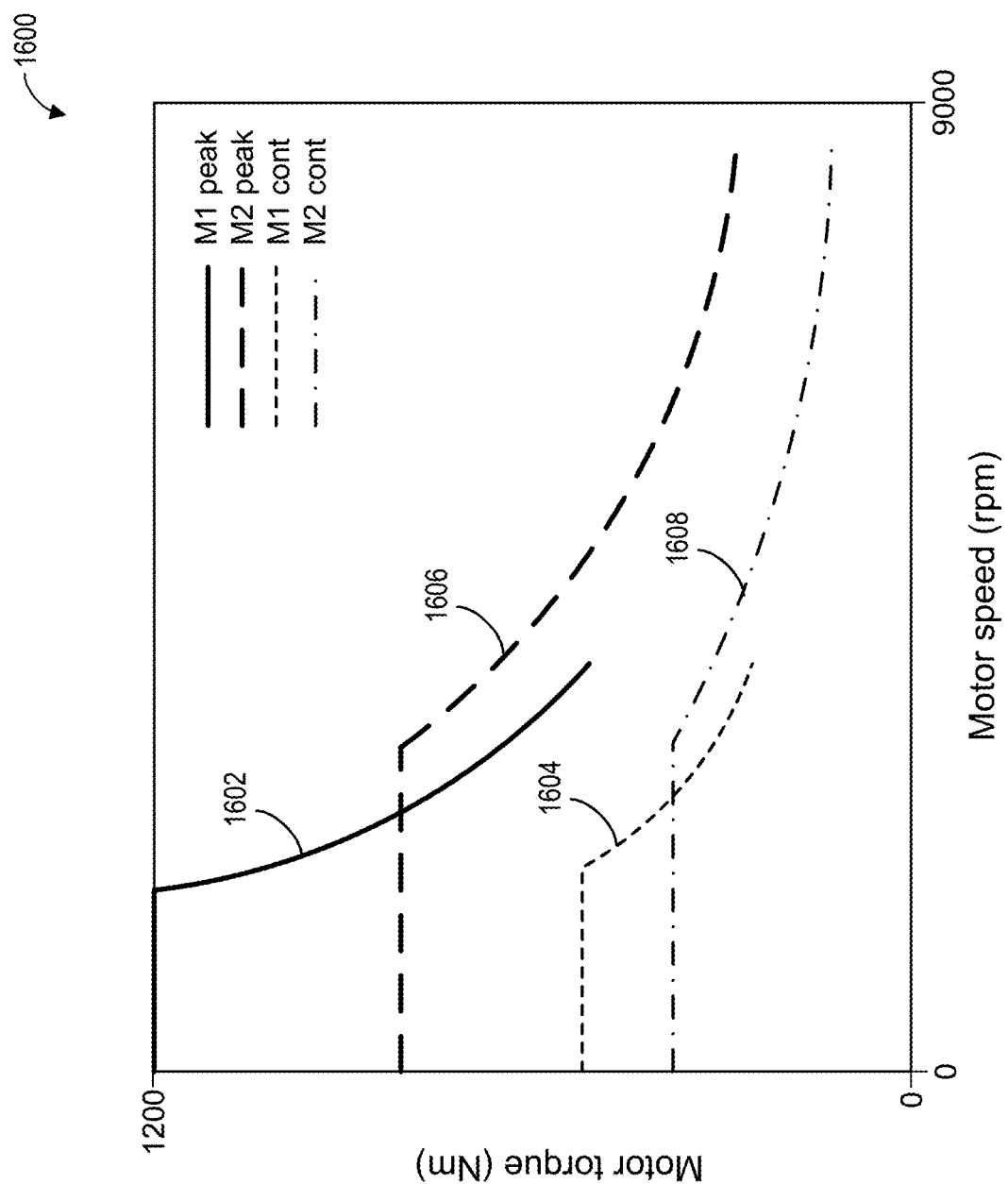
FIG. 16 shows a graph depicting relationships between torque and speed for a first motor and a second motor of a dual motor ICP arrangement for the EV or the HEV operating in the EV mode.

Alternatively, the output node of the Ravigneaux planetary gear set 1402 may be arranged at the ring gear with the carrier floating, as shown in FIG. 15 in a sixth torque lever diagram 1500. In either of the dual motor ICP arrangement with the Ravigneaux planetary gear set with the carrier or the ring gear as the output node, the Ravigneaux planetary gear set may be a summing planetary with full IVT capabilities without relying on clutches, as described above. Other examples of alternate configurations for the dual motor ICP arrangement includes implementation of a compound planetary or a stepped planetary to transmit power from the electric machines to the vehicle wheels.

Figure 17:
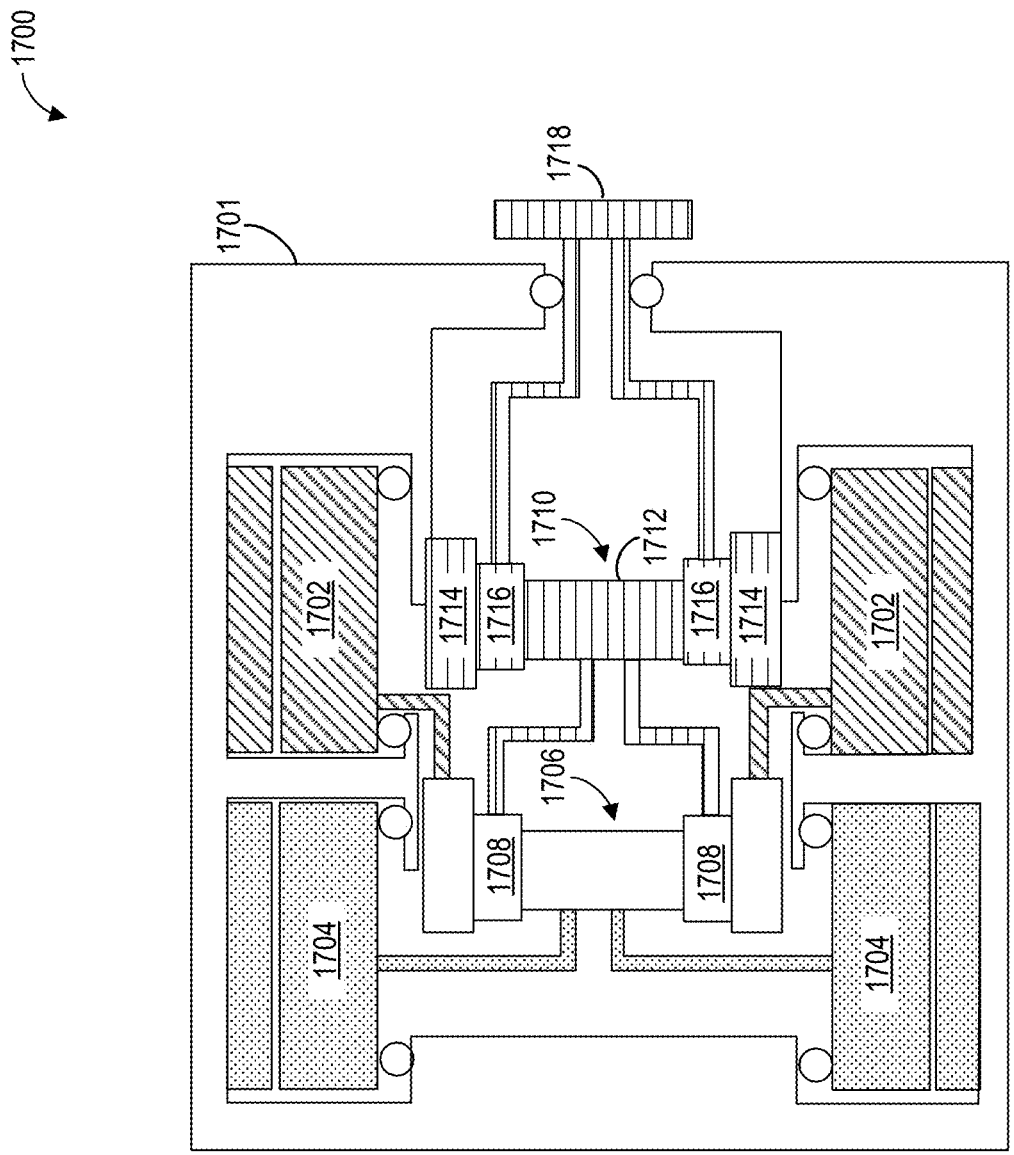
FIG. 17 shows an example of a co-axial arrangement of a dual motor ICP arrangement for the EV or the HEV operating in the EV mode.
Figure 18:
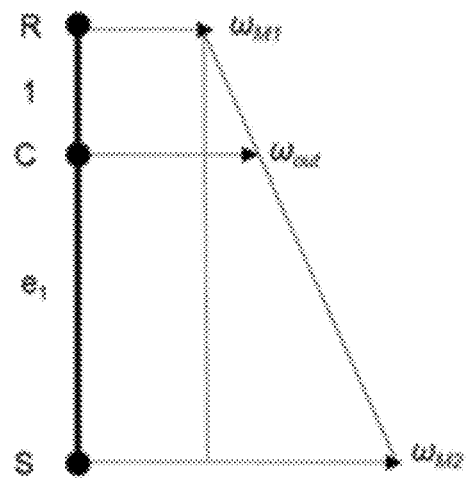
FIG. 18 shows a speed lever diagram for the dual motor ICP arrangement of FIG. 9 with each of a first motor and a second motor operating in a motoring mode.

As described above, the dual motor ICP arrangement may be implemented in different axial configurations. In one example, as shown in FIG. 17, the axial configuration may be a co-axial central mount arrangement 1700. The co-axial central mount arrangement 1700 is housed in a casing 1701 and includes a first electric machine 1702, which may be a low speed, high torque motor, and a second electric machine 1704, which may be a high speed, low torque motor. The first and second electric machines 1702, 1704 may be coupled to a front (with respect to a front end of a vehicle) planetary gear set 1706, which may be an ICP. An output of the two electric machines may be combined at a carrier 1708 of the front planetary gear set 1706 and transmitted to a rear planetary gear set 1710.

The rear planetary gear set 1710 may be an output torque multiplication device with a sun gear 1712 of the rear planetary gear set 1710 configured to receive the combined motor torque from the front planetary gear set 1706. A ring gear 1714 of the rear planetary gear set 1710 may be grounded while a carrier 1716 of the rear planetary gear set 1710 may be coupled to an e-drive output yoke 1718. In this way, power provided to wheels of a vehicle may be delivered across a wide range according to desired vehicle operation.

Control of the dual motor ICP arrangement to match desired vehicle operating conditions may be enabled by operating one of the motors, e.g., electric machines, in a speed control mode and the other of the motors in a torque control mode. As such, the e-drive may be operated as an IVT. The motor providing speed control may set an operating point of each of the motors in a speed domain, enabling optimization of torque, power, and/or efficiency. The motor providing torque control may set a system load where the other motor, e.g., the speed control motor, also contributes to torque output. By altering the speed setpoint of one of the motors, a power ratio between the two asymmetric motors changes.

Selection of which of the two asymmetric motors of the dual motor ICP arrangement is used for speed control and which is used for torque control may vary depending on the system, on sizes of the motors, and on an operating mode of the motors within a drive cycle (e.g., as a motor in a motoring mode, or as a generator in a regeneration mode). As an example, for a dual motor ICP arrangement equipped with a simple planetary gear set, e.g., as shown in FIGS. 9-13, a first motor (MG1) may be selected for torque control and a second motor (MG2) may be selected for speed control. A speed of the second motor may be selected to allow a target speed of the first motor to be maintained, where the target speed for the first motor may be a speed that maintains the first motor at a desired efficiency, circumvents overspeed events, and/or optimizes regeneration.

A control equation for the commanded operating speed of the second motor is shown in equation 8 where $\omega_{M2command}$ is the commanded operating speed of the second motor, $\omega_{carrier}$ is a rotational speed of a carrier which is an output of the planetary gear set, and $\omega_{M1\_target}$ is the target speed of the first motor:

$$\omega_{M2command} = \omega_{carrier}(e_1+1) - \omega_{M1\_target} * e_1 \quad (8)$$

Equation 8 thereby provides a control law for the second motor. The target speed of the first motor may be inferred, as one example, from an efficiency map of one or both motors according to a requested torque of the first motor to estimate a first motor speed that maximizes net system efficiency. In another example, the target speed of the first motor may be selected to maximize system power or torque output.

It will be appreciated that the control law (e.g., equation 8) for the simple planetary gear set is a non-limiting example of an equation for controlling the dual motor ICP arrangement. Other examples where a different type of planetary gear set is implemented, such as the Ravigneaux planetary gear set, may include different control equations but may nonetheless adhere to a similar method of control.

Figure 19:
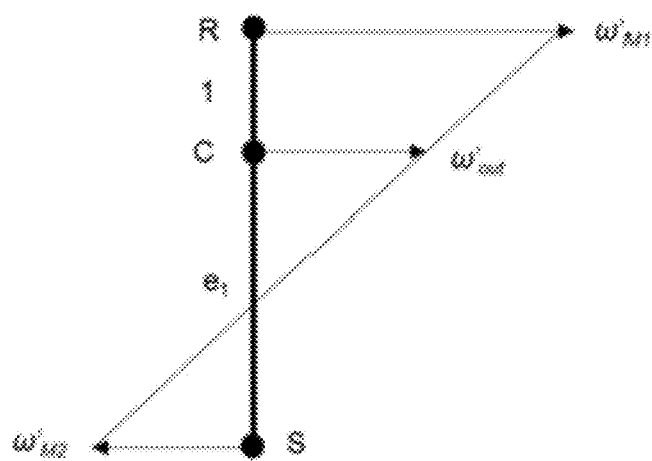
FIG. 19 shows a speed lever diagram for the dual motor ICP arrangement of FIG. 9 with each of the first motor in the motoring mode and the second motor operating in a generating mode.
Figure 20:
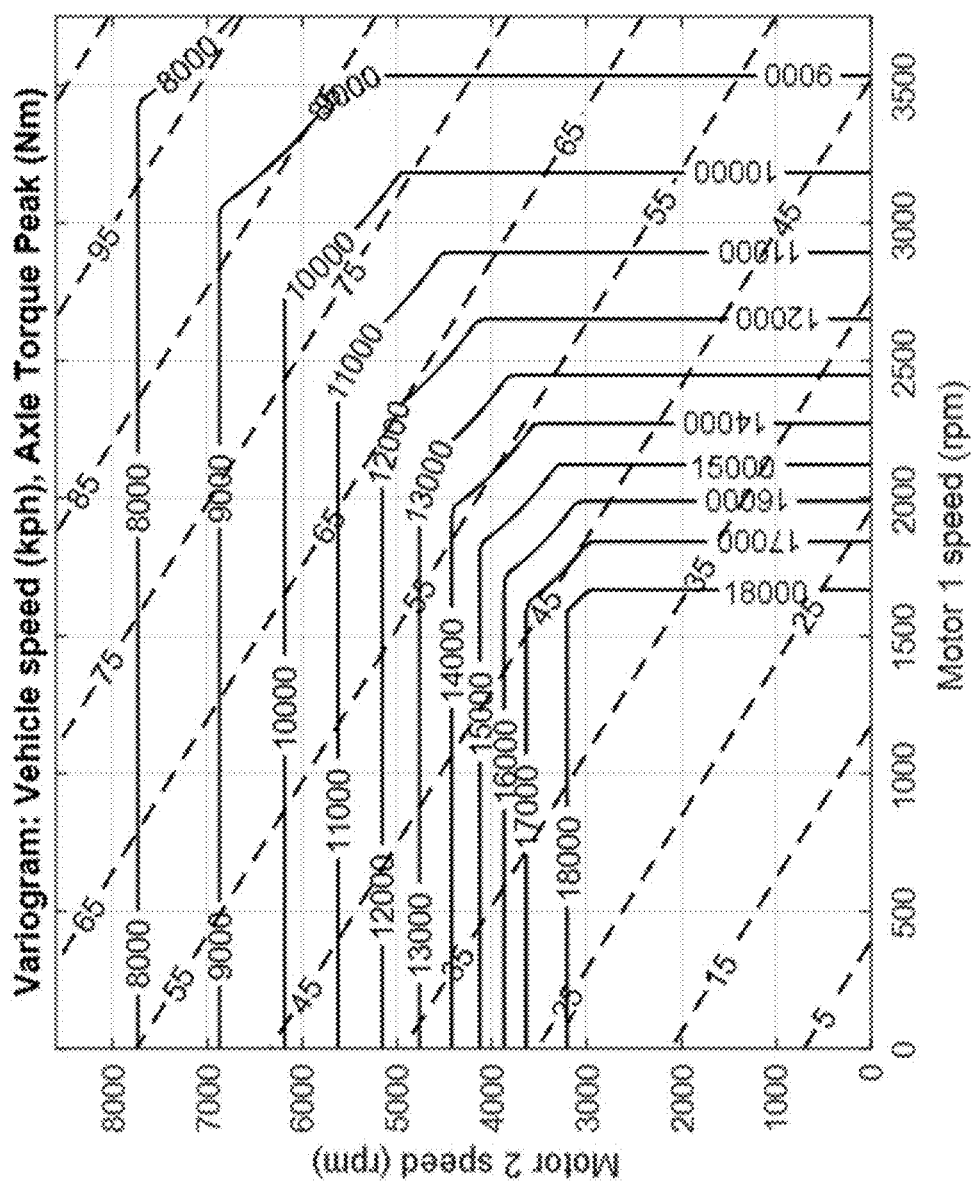
FIG. 20 show an example of a variogram plotted based on a dual motor ICP arrangement for an EV or an HEV operating in the EV mode.

In some instances, the speed (e.g., commanded speed) of the second motor may be in the motoring mode, e.g., positive speed values, or in a generating mode, e.g., negative speed values, while providing positive motor torque to the output node of the planetary gear set. Additional power may be provided by the first motor to maintain an output power of the ICP, e.g., via a torque lever balance of the ICP, according to equation 9:

$$T_{out} * \omega_{out} = T'_{out} * \omega'_{out} \quad (9)$$

where $T_{out}$ and $\omega_{out}$ are the torque output and rotational speed of the first motor and $T'_{out}$ and $\omega'_{out}$ the torque output and rotation speed of the second motor. For example, a first speed lever diagram 1800 illustrated in FIG. 18, corresponding to the dual motor ICP arrangement of FIGS. 9 and 10, shows torque output from the asymmetric first and second motors with both motors operating in the motoring mode. The torque outputs of the motors are constrained to be equal. When the second motor is operating in the generating mode, a second speed lever diagram 1900 depicted in FIG. 19 shows that extra power delivered by the first motor (M1) may result from increased speed.

A variable output of the dual motor ICP arrangement, as controlled via the control law described above, is depicted in FIG. 20 by an example of a variogram 2000. The variogram is a contour plot of relevant IVT output parameters with iso-lines of either constant vehicle or output speed, for example. In the variogram 2000, constant vehicle speeds are indicated in dashed lines and delivered axle torque peaks are indicated as outputs in solid lines, each of the constant vehicle speed and delivered axle torque peaks plotted relative to the speed of the first motor along the x-axis and the speed of the second motor along the y-axis. At a given constant vehicle speed, any combination of motor speed along the line of constant vehicle speed is possible. An axle torque resulting from the given constant vehicle speed is obtained from intersections of one or more of the axle torque peak lines with the vehicle speed. A controller, e.g., the controller 126 of FIG. 1, may choose any pair of motor speeds at the intersections to provide an optimized torque, power or efficiency. It will be appreciated that, in other examples, the variogram may be modified to show a variety of outputs including e-drive torque, e-drive power, etc., and the inputs shown as the dashed lines may be varied to represent other metrics such as output speed, carrier speed, etc.

By setting one of the motors in the speed control mode, an additional DOF between the speed of the vehicle and the speed operating point of the torque control motor is provided. A uniform and consistent output torque delivery is achieved across the speed range of the vehicle, as a result of holding the torque control motor at or below the target speed independent of the vehicle speed. The torque control motor is thereby allowed to produce full torque. In comparison, an e-drive with fixed gearing may not enable full torque output of a motor at high vehicle speeds.

Implementing speed control at one of the motors of the dual motor ICP arrangement further enables a method for single motor operation without use of a clutch via a virtual reaction node to enhance torque output. While torque multiplication may be achieved by configuring the arrangement with a one-way clutch at either the ring gear node or the sun gear node, the virtual reaction node allows the one-way clutch to be omitted, thereby reducing hardware and simplifying the system. Operating the dual motor ICP arrangement in the virtual reaction node includes grounding a node of the planetary gear set by commanding operation of one of the motors to enter a speed control mode with a zero rpm speed command. The node corresponding to the speed control motor is held stationary, thereby adjusting the speed lever of the planetary gear set to operate as a torque multiplication device based on single motor operation. As such, depending on characteristics of the motor and the ring gear to sun gear ratio, e.g., $e_1$ or $e_2$, operation of one motor through the virtual reaction node may provide greater torque output than a dual motor IVT operating mode. In order to circumvent concentrated heat generation at zero rpm speed, the speed command may be adjusted to a small non-zero value to maintain the motor at a low speed that does not adversely affect torque multiplication while minimizing power consumption and distributing heat around the motor windings.

For example, if the first motor is the virtual reaction node and torque at the second motor is multiplied, a reaction torque (e.g., a force acting on an object that is not free to rotate) at the first motor ($T_{M1\_reaction}$) is described by equation 10:

$$T_{M1\_reaction} = -T_{M2} * e_1 \quad (10)$$

At the zero rpm speed command, if equation 11 is satisfied, $$T_{M2} * (e_1+1) > T_{M1} + T_{M2} \quad (11)$$

then, solving for $e_1$ results in equation 12:

$$e_1 > T_{M1}/T_{M2} \quad (12)$$

Thus, the virtual reaction node allows the dual motor ICP arrangement to seamlessly switch between dual motor and single motor operation with torque multiplication in an EV. Operation at the virtual reaction node may be advantageous during high launch torque demands and low speed ascent along steep grades, for example.

Although an engine is not included as an input to the ICP, pseudo mechanical points are enabled in the dual motor ICP arrangement which may be similar to the dual mechanical points described above with respect to an HEV. At the pseudo mechanical points, one of the motors is held near zero speed, thereby theoretically consuming zero mechanical power. For example, equations 13 and 14 describe a first pseudo mechanical point, $psm_1$, at the first motor and a second pseudo mechanical point, $psm_2$, at the second motor, respectively:

$$psm_1 @ \omega_{out} = \omega_{M2}/(e_1+1) \quad (13)$$

$$psm_2 @ \omega_{out} = \omega_{M1}*(e_1/(e_1+1)) \quad (14)$$

By operating at or near one of the pseudo mechanical points during light load events, motor losses, including speed-based losses and parasitic magnet drag, may be reduced. Furthermore, when implementing the control method for the dual motor ICP arrangement, battery power consumption may be minimized. The e-drive may therefore operate at/near the pseudo mechanical points when the EV is cruising, such as highway driving.

An example for a method 2100 for operating a dual motor ICP arrangement for an HEV is shown in FIG. 21. The dual motor ICP arrangement may be configured as either of the arrangements shown in FIGS. 2-3 and may include asymmetric dual motors (where the motors may be electric machines, capable of operation in a motoring mode and a generating mode) or symmetric dual motors with transfer gearing arranged between at least one of the dual motors and the ICP. The dual motors may be positioned on opposite sides of an output node of the ICP. Alternatively, a compound planetary gear set, multiple simple planetary gear sets, or a stepped planetary gear set may be used. Instructions for carrying out method 2100 and the methods described herein may be executed by a controller, such as the controller 126 of FIG. 1, based on instructions stored on a memory of the controller and in conjunction with signals received from sensors of the HEV, such as the sensors 128 described above with reference to FIG. 1. The controller may employ actuators of the EV system, e.g., the actuators 130 of FIG. 1, to adjust vehicle operation, according to the methods described below.

At 2102, the method 2100 includes estimating and/or measuring operating conditions of the HEV. For example, a current operating mode (e.g., EV mode, a power split mode, etc.) of the HEV, an engine speed, a vehicle speed, a speed and torque of each of the dual motors, a temperature of the motors, a battery SOC, etc., may be determined based on signals from the vehicle sensors.

The method 2100 includes confirming if the current operating mode allows efficiency targets of the HEV to be met at 2104. The efficiency targets may include maintaining the battery SOC at a target level, reducing electrical power losses, optimizing mechanical efficiencies of the motors, maintaining a torque lever balance of the ICP, and minimizing fuel consumption, amongst others. If the efficiency targets are met, the method 2104 proceeds to 2106 to continue vehicle operation in the current operating mode under the current operating conditions. The method 2100 returns to the start. If the efficiency targets are not met, the method 2104 continues to 2108 to determine if the battery SOC is greater than a first threshold.

The first threshold may be a SOC that allows the HEV to operate with reduced fuel consumption for a desired range, such as 400 km. For example, the first threshold may be a battery SOC of 40%. If the battery SOC is greater than the first threshold, the method 2100 continues to 2110 to confirm if a fuel level of the HEV is less than a second threshold. The second threshold may be a volume of fuel in a fuel tank of the HEV below which the fuel tank may become emptied and unable to provide engine torque within a threshold travel distance based on the current operating mode. For example, the HEV may be in a power split mode and the second threshold may be 10% of a maximum capacity of the fuel tank. Continued operation of the HEV in the current mode may thereby provide propulsion for, as an example, another 50 km.

If the fuel level is less than the second threshold, the method 2100 proceeds to 2112 to adjust the operating mode of the HEV to a two motor EV mode, e.g., as shown in Table 2 and described further below with reference to FIG. 23. The method 2100 continues to 2204 of a method 2200 depicted in FIG. 22. In some examples, the HEV may already be operating in the two motor EV mode. As such, operation of the dual motors may be adjusted according to the method 2200 of FIG. 22. The method 2100 returns to the start.

If the fuel level is equal to or greater than the second threshold, the method 2100 continues to 2114 to determine if a torque demand is greater than a third threshold. The torque demand may be an amount of requested torque indicated by, for example, an extent of an acceleration pedal depression. The third threshold may be a maximum amount of torque deliverable by the dual motors. If the torque demand does not exceed the third threshold, the method 2100 continues to 2112 to adjust the HEV mode of operation to the two motor EV mode to conserve fuel usage. If the torque demand exceeds the third threshold, the method 2100 proceeds to 2116 to adjust the HEV operating mode to a two motor HEV mode, e.g., as shown in Table 2. The method 2100 returns to the start.

Returning to 2108, if the battery SOC does not surpass the first threshold, the method 2100 proceeds to 2118 to adjust the HEV to a first or a second power split mode of operation (e.g., M1 or M2 described above), according to a method 2300 depicted in FIG. 23. It will be appreciated that in some examples, the HEV may already be in one of the power split modes. In such instances, operation of the dual motors and the engine may be adjusted according to the method 2300. The method 2100 returns to the start.

It will further be appreciated that if, during execution of methods 2100, 2200, and 2300, a braking operation is initiated, e.g., a tip-in at a brake pedal is detected, the HEV (or an EV) may be adjusted to a regenerative braking mode. For example, the HEV, when operating in one of the power split modes or the two motor HEV mode, may be modified to an HEV regenerative braking mode, as shown in Table 2. For the EV (or when the HEV is operating in the two motor EV mode), the EV may be adjusted to the EV regenerative braking mode, as shown in Table 2. Upon release of the brake pedal, the HEV or EV may resume its previous mode of operation or be adjusted to a more suitable mode thereafter. Furthermore, the HEV may be operated in a reverse propulsion direction. During such operation, the operating mode may be adjusted to a reverse power split mode (e.g., as shown in Table 2) until forward propulsion is resumed.

The method 2200 of FIG. 22 shows an example of a routine for operating a dual motor ICP arrangement for an EV (or for the HEV operating in the two motor EV mode). As such, reference hereafter to the EV also includes the HEV operating in the two motor EV mode. The dual motor ICP arrangement may be configured as any of the arrangements shown in FIGS. 9-15 (in addition to the HEV configurations of FIGS. 2 and 3) and may include symmetric or asymmetric dual motors positioned on opposite sides of an output node of the ICP. As described above, instructions for carrying out method 2200 may be executed by the controller based on instructions stored on a memory of the controller and in conjunction with signals received from sensors of the EV, such as the sensors 128 described above with reference to FIG. 1. The controller may employ actuators of the EV system, e.g., the actuators 130 of FIG. 1, to adjust vehicle operation, according to the methods described below.

At 2202, the method 2200 includes estimating and/or measuring operating conditions of the EV. For example, the vehicle speed, the speed and torque of each of the dual motors, the temperature of the motors, the battery SOC, etc., may be determined based on signals from the vehicle sensors. The method 2200 includes confirming if a torque supply provided by the motors meets a torque demand at 2204. The torque demand may be indicated based on, for example, an accelerator pedal tip-in or depression of a brake pedal. The torque supply may meet the demand when an amount of torque output at the output node of the ICP matches the requested torque.

If the torque supply does not match the demand, e.g., the supply is higher or lower than the torque demand, the method 2200 continues to 2206 to set a speed of a first motor of the dual motors. The first motor may be adjusted to a torque control mode where the speed of the first motor may be selected based on, for example, an efficiency map of the first motor stored in the controller's memory. The efficiency map may provide a motor speed corresponding to a target efficiency point of the first motor. A speed set point of the first motor may be also be selected to circumvent motor overspeed or to optimize regeneration. The speed of the first motor may be positive or negative, depending on operation of the first motor in a motoring mode or a generating mode.

At 2208, the method 2200 includes setting a speed of a second motor of the dual motors. The second motor may be operated in a speed control mode and the speed of the second motor may inferred based on the speed of the first motor. In one example, the speed of the second motor may be estimated according to a variogram stored in the controller's memory, such as the variogram 2000 shown in FIG. 20, where the second motor speed is determined at an intersection of the first motor speed and a desired axle torque output or vehicle speed. In some examples, when operation of both motors in a motoring mode is not demanded, the speed of the second motor may be positive or negative, according to operation of the second motor in the motoring mode or a generating mode. For example, if the torque supply is lower than the torque demand and the first motor speed is at a target speed, the speed of the second motor may be decreased by an amount that results in a net torque output, e.g., a sum of torque outputs from the dual motors, that meets the torque demand. The method 2200 returns to the start.

In some examples, a large increase in torque output at the ICP may be requested during, as one example, vehicle launch. In response, the dual motor ICP arrangement may operate at a virtual reaction node, as described above, by commanding operation of the second motor at zero speed, e.g., adjusting to single motor operation. When operating at zero speed, the second motor may still spin slowly to mitigate localized heat generation. At the virtual reaction node, the torque output of the first motor may be multiplied, allowing more torque to be delivered than operating both motors in the motoring mode.

Alternatively, if the torque supply is higher than the torque demand and the first motor speed is at the target speed, the speed of the second motor may be increased to reduce the output torque at the ICP. In some examples, the second motor may be operated at a negative torque, e.g., in the generating mode, if the torque demand is met by the operation of the first motor in the motoring mode and the SOC of the battery falls below a threshold level, indicating regeneration is desirable.

In some instances, operation of the dual motor ICP arrangement may be adjusted to one of two pseudo mechanical points when torque demand is low, e.g. during cruising and the dual motors are asymmetric. At either of the pseudo mechanical points, one of the dual motors is held at or near zero speed, thereby reducing consumption of battery as well as decreasing both speed-based losses and parasitic magnet drag at the motors. Selection of which of the motors to hold at or near zero speed may be determined based on vehicle speed and speed operating ranges of the motors. For example, when vehicle speed is high, the motor with the lower speed operating range may be used to control torque output with the motor with the higher speed operating range held at or near zero speed. Alternatively, when vehicle speed is low, the motor with the higher speed operating range may be used to control torque output and the motor with the lower speed operating range may be held at or near zero speed.

Returning to 2204, if the torque supply matches the demand, the method 2200 proceeds to 2210 to determine if the battery SOC at least reaches a threshold. For example, the threshold may be a remaining amount of battery charge estimated to provide sufficient mileage for the vehicle to arrive at a known charging location based on historical data stored in the controller's memory. As an example, the threshold may be a battery SOC of 10%. Other values are possible, however, and may vary depending on vehicle operation, e.g., the threshold may be higher if the vehicle is anticipated to increase in load based on, for example, GPS and route planning information. If the battery SOC is at least equal to the threshold, the method 2200 continues to 2212 to continue vehicle operations under the current conditions. The method 2200 returns to the start.

If the battery SOC does not reach the threshold at 2210, the method 2200 proceeds to 2214 to operate at least one of the motors in the generating mode. As such, in order to maintain the torque output, the speed of the motor remaining in the motoring mode may be adjusted. In some examples, the threshold may be set such that when the battery SOC falls below the threshold, regeneration may be prioritized over meeting the torque demand. As a result, the torque supply may fall below the torque demand until the battery SOC rises sufficiently to allow the torque demand to be met while maintaining the battery SOC at or above the threshold. The method 2200 returns to the start when implemented in the EV. When applied to the HEV, the method 2200 returns to FIG. 21, e.g., to 2112 of the method 2100.

The method 2300 of FIG. 23 shows an example of a routine for operating the HEV in either the first or the second power split mode. At 2302, the method 2300 includes selecting one of the first power split mode or the second power split mode (e.g., Mode 1 or Mode 2) for hybrid operation (e.g., as shown in Table 2 and described above). Selection of the first or the second power split mode may be determined based on the vehicle speed and based on a matching of a motor of the dual motors with a suitable speed operating range to provide supplemental torque to the selected power split mode.

The method continues to 2304 to adjust operation of the dual motors and the engine to meet the efficiency targets, e.g., the efficiency targets described above with reference to 2104 of FIG. 21. Adjusting operation of the dual motors and the engine may include estimating a speed and a torque demanded of a first motor (MG1) of the dual motors at 2306. The first motor may participate in the power split and may be operated in a speed control mode and the generating mode while a second motor of the dual motors provides supplemental torque to meet an output torque demand at the output node of the ICP. For example, the speed and torque demanded of the first motor may be determined based on inputs including the current vehicle speed, an optimal engine speed estimated from an ECMS routine, the battery SOC, and an output torque demand at the output node of the ICP.

Adjusting operation of the motors and the engine may also include estimating a torque demanded of the engine at 2308. For example, the torque demanded of the engine may be determined based on the estimated torque demanded of the first motor and the output torque demand. The estimated torque demanded of the engine may be used at 2310, along with the output torque demand, to infer a torque demanded of the second motor. Furthermore, the resulting estimated torques of the input components may be modified by an optional weighting function at 2312, as described above with reference to equation 7. If the torque demanded of either of the motors exceeds a maximum torque of the motors, the weighting function may be applied until the estimated torque demands are within allowable torque ranges of the motors. Speeds of the motors and the engine may thereby be modified to provide the torque to be output at the output node of the ICP. The method returns to FIG. 21, e.g., to 2118 of the method 2100.

In some instances, such as when the HEV is operating at a steady state, e.g., cruising at light loads, the dual motor ICP arrangement may be adjusted to operate at one of two mechanical points when operating in one of the power split modes. During cruising, operation at one of the mechanical points precludes an inherent weakness of a single mode power split where highway speeds demand engine speed to be raised progressively higher as vehicle speed increases. The dual mechanical points allow a mode switch to occur instead to maintain engine speed within a high efficiency zone. For example, at a first mechanical point, the first motor may be held at or near zero speed and all input torque at the ICP may be provided by the engine. At a second mechanical point, the second motor may be held at or near zero speed and all input torque at the ICP may be provided by the engine.

In this way, a dual motor ICP arrangement may be used in an e-drive to provide propulsion to a vehicle, the arrangement allowing an additional DOF to a speed lever of the ICP and thereby removing a dependency of motor speed on vehicle speed. The motors may be arranged on either side of an output node of the ICP, with one motor operating in a torque control mode and the other motor operating in a speed control mode. As such, the vehicle is able to adjust operation according to operating conditions such as vehicle speed, torque demand, battery SOC, and motor efficiency. When the vehicle is an HEV, the dual motor ICP enables an increase number of operating modes, including an all-electric and two power split hybrid modes, as well as availability of two mechanical points. For an EV or when the HEV is operating in the all-electric mode, the arrangement may switch readily between single motor and dual motor operation without use of clutches and operate with EVT and IVT capabilities. Torque multiplication is enabled via a virtual reaction node as well as operation of the e-drive at pseudo mechanical points. As a result, an efficiency of e-drive operation, a region of constant torque operation, and a capacity for battery regeneration is increased.

The technical effect of implementing the dual motor ICP arrangement in the e-drive of the vehicle is that an efficiency of vehicle operation and a range of operating modes of the vehicle is increased.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

The disclosure also provides support for a method for an electric drive train of a vehicle, comprising: operating a first motor of a set of motors in a torque control mode at a first speed, and operating a second motor of the set of motors in a speed control mode at a second speed, the second speed determined based on the first speed of the first motor, summing a first torque generated by the first motor and a second torque generated by the second motor at an output node of a planetary gear set coupled to each of the first motor and the second motor, wherein the first motor and the second motor are coupled to the planetary gear set on opposite sides of the output node of the planetary gear set. In a first example of the method, operating the first motor at the first speed includes selecting the first speed based on a desired efficiency point at an efficiency map of the first motor. In a second example of the method, optionally including the first example, operating the second motor at the second speed includes selecting the second speed based on an estimated relationship between the first speed of the first motor and a gear ratio of a first gear of the planetary gear set coupled to the first motor to a second gear of the planetary gear set coupled to the second motor and wherein the second speed is selected to allow the first speed of the first motor to be maintained constant. In a third example of the method, optionally including one or both of the first and second examples, the method further comprises: adjusting the first speed of the first motor and the second speed of the second motor in response to a change in a demand for vehicle speed and/or power to maintain operation of the first motor and the second motor at respective target operating set points of each of the first motor and the second motor. In a fourth example of the method, optionally including one or more or each of the first through third examples, the method further comprises: determining an allowable combination of the first speed of the first motor and the second speed of the second motor based on an estimated relationship between plotted contours of output torque at an axle and plotted lines of constant vehicle speeds relative to the first speed of the first motor and the second speed of the second motor. In a fifth example of the method, optionally including one or more or each of the first through fourth examples, operating the first motor at the first speed includes generating a maximum torque output of the first motor at high vehicle speeds. In a sixth example of the method, optionally including one or more or each of the first through fifth examples, operating each of the first motor and the second motor includes selecting the first speed of the first motor and selecting the second speed of the second motor unconstrained by a speed of the vehicle.

The disclosure also provides support for a drive train for an electric vehicle, comprising: a planetary gear set, a first electric machine coupled to a first input node of the planetary gear set on a first side of an output node of the planetary gear set, a second electric machine coupled to a second input node of the planetary gear set, the second input node on a second side of the output node, opposite of the first side, and a controller configured with executable instructions stored on non-transitory memory which, when executed, cause the controller to: operate the first electric machine at a first speed in a torque control mode, and operate the second electric machine at a second speed in a speed control mode, the second speed selected based on the first speed of the first electric machine, and wherein a first torque generated by the first electric machine and a second torque generated by the second electric machine are summed at the output node of the planetary gear set. In a first example of the system, the first electric machine is a low speed, high torque motor and the second electric machine is a high speed, low torque motor. In a second example of the system, optionally including the first example, the first electric machine and the second electric machine have similar speed and torque ranges and wherein one or more of the first electric machine and the second electric machine is coupled to the first input node and the second input node, respectively, by transfer gearing. In a third example of the system, optionally including one or both of the first and second examples, the planetary gear set is a simple planetary gear set with three nodes and a carrier of the simple planetary gear set is the output node. In a fourth example of the system, optionally including one or more or each of the first through third examples, the planetary gear set is a Ravigneaux gear set with four nodes and one of a carrier and a ring gear is the output node. In a fifth example of the system, optionally including one or more or each of the first through fourth examples, the drive train operates as an infinitely variable transmission and an electrically variable transmission. In a sixth example of the system, optionally including one or more or each of the first through fifth examples, the drive train is configured to operate at a virtual reaction node and wherein at the virtual reaction node the drive train is operated in a single motor, torque multiplication mode when the first electric machine or the second electric machine is commanded to operate at zero speed. In a seventh example of the system, optionally including one or more or each of the first through sixth examples, the drive train is configured to operate at two pseudo mechanical points to reduce consumption of battery energy and wherein a first pseudo mechanical point is an operating mode where the first electric machine is held at zero speed and the second electric machine is at a non-zero speed and a second pseudo mechanical point is an operating mode where the second electric machine is held at zero speed and the first electric machine is at a non-zero speed. In a eighth example of the system, optionally including one or more or each of the first through seventh examples, the drive train operates at the first pseudo mechanical point at light vehicle loads and low vehicle speeds and at the second pseudo mechanical point at light vehicle loads and high vehicle speeds.

The disclosure also provides support for a method for operating a drive train of an electric vehicle, comprising: summing a first torque output of a first motor of the drive train and a second torque output of a second motor of the drive train onto an output node of a planetary gear set coupled to each of the first motor and the second motor, and responsive to an increase in torque demand, operating the drive train in a single motor mode with torque multiplication by commanding operation of one of the first motor and the second motor at zero speed, and responsive to a decrease in torque demand, operating the drive train at a pseudo mechanical point to reduce consumption of electrical energy and to reduce mechanical losses at one of the first motor and the second motor. In a first example of the method, operating the drive train in the single motor mode includes adjusting the drive train from a dual motor mode to the single motor mode without a clutch and wherein commanding operation of one of the first motor and the second motor at zero speed includes adjusting one of the first motor and the second motor to a speed control mode and decreasing a speed of the one of the first motor and the second motor to near stationary. In a second example of the method, optionally including the first example, operating the drive train with torque multiplication includes outputting more torque at the output node from one of the first motor and the second motor than an amount of torque summed at the output node when both of the first motor and the second motor are operating at non-zero speeds. In a third example of the method, optionally including one or both of the first and second examples, the method further comprises: adjusting a speed of the first motor and a speed of the second motor unconstrained by a speed of the electric vehicle.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an electric drive train of a vehicle, comprising:
    operating a first motor of a set of motors in a torque control mode at a first speed;

operating a second motor of the set of motors in a speed control mode at a second speed, the second speed determined based on the first speed of the first motor;

summing a first torque generated by the first motor and a second torque generated by the second motor at an output node of a planetary gear set coupled to each of the first motor and the second motor, wherein the first motor and the second motor are coupled to the planetary gear set on opposite sides of the output node of the planetary gear set; and operating the drive train with one of the first motor or the second motor at or near zero speed to reduce consumption of electrical energy and to reduce mechanical losses at one of the first motor and the second motor.

2. The method of claim 1, wherein operating the first motor at the first speed includes selecting the first speed based on a desired efficiency point at an efficiency map of the first motor.

3. The method of claim 1, wherein operating the second motor at the second speed includes selecting the second speed based on an estimated relationship between the first speed of the first motor and a gear ratio of a first gear of the planetary gear set coupled to the first motor to a second gear of the planetary gear set coupled to the second motor and wherein the second speed is selected to allow the first speed of the first motor to be maintained constant.

4. The method of claim 1, further comprising adjusting the first speed of the first motor and the second speed of the second motor in response to a change in a demand for vehicle speed and/or power to maintain operation of the first motor and the second motor at respective target operating set points of each of the first motor and the second motor.

5. The method of claim 1, further comprising determining an allowable combination of the first speed of the first motor and the second speed of the second motor based on an estimated relationship between plotted contours of output torque at an axle and plotted lines of constant vehicle speeds relative to the first speed of the first motor and the second speed of the second motor.

6. The method of claim 1, wherein operating the drive train with one of the first motor or the second motor at or near zero speed operates the drive train at a pseudo mechanical point.

7. The method of claim 1, further comprising operating the drive train in a single motor, torque multiplication mode when the first electric machine or the second electric machine is commanded to operate at zero speed.

8. A drive train for an electric vehicle, comprising:
a planetary gear set;
a first electric machine coupled to a first input node of the planetary gear set on a first side of an output node of the planetary gear set;
a second electric machine coupled to a second input node of the planetary gear set, the second input node on a second side of the output node, opposite of the first side; and
a controller configured with executable instructions stored on non-transitory memory which, when executed, cause the controller to:
operate the first electric machine at a first speed in a torque control mode;
operate the second electric machine at a second speed in a speed control mode, the second speed selected based on the first speed of the first electric machine, and wherein a first torque generated by the first electric machine and a second torque generated by the second electric machine are summed at the output node of the planetary gear set; and
operate the drive train in a single motor, torque multiplication mode when the first electric machine or the second electric machine is commanded to operate at zero speed.

9. The drive train of claim 8, wherein the first electric machine is a low speed, high torque motor and the second electric machine is a high speed, low torque motor.

10. The drive train of claim 8, wherein the first electric machine and the second electric machine have similar speed and torque ranges and wherein one or more of the first electric machine and the second electric machine is coupled to the first input node and the second input node, respectively, by transfer gearing.

11. The drive train of claim 8, wherein the planetary gear set is a simple planetary gear set with three nodes and a carrier of the simple planetary gear set is the output node.

12. The drive train of claim 8, wherein the planetary gear set is a Ravigneaux gear set with four nodes and one of a carrier and a ring gear is the output node.

13. The drive train of claim 8, wherein the drive train operates as an infinitely variable transmission and an electrically variable transmission.

14. The drive train of claim 8, wherein the drive train is at a virtual reaction node when the drive train is operated in a single motor, torque multiplication mode.

15. The drive train of claim 8, wherein the drive train is configured to operate at two pseudo mechanical points to reduce consumption of battery energy and wherein a first pseudo mechanical point is an operating mode where the first electric machine is held at zero speed and the second electric machine is at a non-zero speed and a second pseudo mechanical point is an operating mode where the second electric machine is held at zero speed and the first electric machine is at a non-zero speed.

16. The drive train of claim 15, wherein the drive train operates at the first pseudo mechanical point at light vehicle loads and low vehicle speeds and at the second pseudo mechanical point at light vehicle loads and high vehicle speeds.

17. A method for operating a drive train of an electric vehicle, comprising:
summing a first torque output of a first motor of the drive train and a second torque output of a second motor of the drive train onto an output node of a planetary gear set coupled to each of the first motor and the second motor;
responsive to an increase in torque demand,
operating the drive train in a single motor mode with torque multiplication by commanding operation of one of the first motor and the second motor at zero speed; and
responsive to a decrease in torque demand,
operating the drive train at a pseudo mechanical point to reduce consumption of electrical energy and to reduce mechanical losses at one of the first motor and the second motor.

18. The method of claim 17, wherein operating the drive train in the single motor mode includes adjusting the drive train from a dual motor mode to the single motor mode without a clutch and wherein commanding operation of one of the first motor and the second motor at zero speed includes adjusting one of the first motor and the second motor to a speed control mode and decreasing a speed of the one of the first motor and the second motor to near stationary.

19. The method of claim 18, wherein operating the drive train with torque multiplication includes outputting more torque at the output node from one of the first motor and the second motor than an amount of torque summed at the output node when both of the first motor and the second motor are operating at non-zero speeds.

20. The method of claim 19, further comprising adjusting a speed of the first motor and a speed of the second motor unconstrained by a speed of the electric vehicle.

* * * * *